(12) United States Patent
Mondello et al.

(10) Patent No.: US 11,573,214 B2
(45) Date of Patent: Feb. 7, 2023

(54) IDENTIFICATION OF UNKNOWN COMPOUNDS BY USING A NOVEL RETENTION INDEX SYSTEM IN LIQUID CHROMATOGRAPHY

(71) Applicant: CHROMALEONT SRL, Messina (IT)

(72) Inventors: Luigi Mondello, Messina (IT); Francesca Rigano, Messina (IT)

(73) Assignee: CHROMALEONT SRL, Messina (IT)

( * ) Notice: Subject to any disclaimer, the term of this patent is extended or adjusted under 35 U.S.C. 154(b) by 950 days.

(21) Appl. No.: 16/347,357

(22) PCT Filed: Nov. 7, 2017

(86) PCT No.: PCT/EP2017/078453
§ 371 (c)(1),
(2) Date: May 3, 2019

(87) PCT Pub. No.: WO2018/083334
PCT Pub. Date: May 11, 2018

(65) Prior Publication Data
US 2020/0264143 A1   Aug. 20, 2020

(30) Foreign Application Priority Data
Nov. 7, 2016   (IT) .................... 102016000111757

(51) Int. Cl.
*G01N 30/86*   (2006.01)

(52) U.S. Cl.
CPC ..... *G01N 30/8668* (2013.01); *G01N 30/8682* (2013.01); *G01N 30/8686* (2013.01)

(58) Field of Classification Search
None
See application file for complete search history.

(56) References Cited

U.S. PATENT DOCUMENTS 4,874,791 A * 10/1989 Adachi .................. A61K 31/20
514/880

FOREIGN PATENT DOCUMENTS

| JP | H0572191 A | 3/1993 |
| JP | 2014048173 A | 3/2014 |
| WO | 2013134862 A1 | 9/2013 |

OTHER PUBLICATIONS

Ruig, "Infrared spectra of monoacid triglycerides:with some applications to fat analysis (Agricultural research reports, nr. 759)", Centre for Agricultural Publishing and Documentation, 1971, 4 pages.
Solaesa et al., "Characterization of Triacylglycerol Composition of Fish Oils by Using Chromatographic Techniques", Journal of Oleo Science, 2014, vol. 63, No. 5, pp. 449-460.

(Continued)

*Primary Examiner* — Daniel S Larkin
(74) *Attorney, Agent, or Firm* — Lucas & Mercanti, LLP

(57) ABSTRACT

A method for the identification of unknown compounds based on a novel Retention Index System having a TAGs homologous series, wherein such identification is performed by means of liquid chromatography (LC), or liquid chromatography coupled with mass spectrometry (LC-MS) is disclosed.

10 Claims, 8 Drawing Sheets

(56) References Cited

OTHER PUBLICATIONS

Wei et al., "Quantitation of triacyiglycerols in edible oils by off-line comprehensive two-dimensional liquid chromatography-atmospheric pressure chemical ionization mass spectrometry using a single column", Journal of Chromatography, 2015, vol. 1404. pp. 60-71.

Compton et al., "The high-performance liquid chromatography and detection of phospholipids and triglycerides. Part 1. Nonpolar stationary phase chromatographic behavior in ultraviolet transparent mobile phases", Analytica Chimica Acta, 1982, vol. 141, pp. 405-410.

Evans et al., "Gas-liquid chromatography in qualitative analysis. Part V. The determination of relative retentions in Rx9 and retention index units by means of secondary standards", Journal of Chromatography A, 1963, vol. 12, pp. 2-7.

Segall et al., "Analysis of triacylglycerol isomers in Malaysian cocoa butter using HPLC-mass spectrometry", Food Research International, 2005, vol. 38, No. 2, pp. 167-174.

International Search Report and Written Opinion for International Application No. PCT/EP2017/078453 (12 Pages) (dated Apr. 3, 2018).

Helmholdt et al., "Structure of C15-, C17- and C19-mono-acid B-triacylglycerols", Acta Cryst., 2002, vol. 58, No. 1, pp. 134-139.

Office Action for Corresponding European Application No. 17800768.8 (5 Pages) (dated Jun. 19, 2020).

Jasper, "GC-HID- and Acyl Carbon Number-Based Determination of Characteristic Groupings of Complex Triglyceride (Benefat S and Other) Mixtures", J. Agric. Food Chem., 2000, vol. 48, No. 3, pp. 785-791.

Dugo et al., "Determination of triacylglycerols in donkey milk by using high performance liquid chromatography coupled with atmospheric pressure chemical ionization mass spectrometry", J. Sep SCI, 2005, vol. 28, pp. 1023-1030.

Balcao et al., "Lipase-catalyzed acidolysis of butterfat with oleic acid: Characterization of process and product", Enzyme Microb. Technol., 1998, vol. 23, pp. 118-128.

Laakso et al., "Composition of the Triacylglycerols of Butterfat and Its Fractions Obtained by an Industrial Melt Crystallization Process", J. Agric. Food Chem., 1992, vol. 40, No. 12, pp. 2472-2482.

Hirotoshi et al., "A Program for Predicting Aliphatic Compounds Using Linear Equations of GC Retention Index Value", Nippon Shokuhin Kogyo Gakkaishi, 1991, vol. 38, No. 10, pp. 934-939.

* cited by examiner

IDENTIFICATION OF UNKNOWN COMPOUNDS BY USING A NOVEL RETENTION INDEX SYSTEM IN LIQUID CHROMATOGRAPHY

CROSS-REFERENCE TO RELATED APPLICATIONS

This application is a 371 of PCT/EP2017/078453, filed Nov. 7, 2017, which claims the benefit of Italian Patent Application No. 102016000111757, filed Nov. 7, 2016.

FIELD OF THE INVENTION

The present invention relates to a method for the identification of unknown compounds based on a novel Retention Index System, wherein such identification is performed by means of liquid chromatography (LC), or liquid chromatography coupled with mass spectrometry (LC-MS).

BACKGROUND OF THE INVENTION

Prior to the introduction of the retention index system, the qualitative chromatographic analysis relied on absolute retention time ($t_R$) and/or relative retention time ($t_{R(Rel)}$) as identification parameters.

Absolute retention time approach consists of comparing an analyte retention time with those of known compounds (e.g., listed $t_R$ of reference compounds): if the $t_R$ of a peak is the same as a reference, then a positive identification can be made.

However, such approach is reliable only under constant chromatographic conditions: even a slight difference may cause retention time deviations, making it very difficult, if not impossible, to identify analytes of interest. Therefore, due to the high variability of the absolute retention time, such an approach poses a problem of reproducibility.

In order to overcome this problem, the relative retention time approach (i.e. ratio between an analyte $t_R$ and an internal standard $t_R$) can be used. In this way, due to the equal effect on both compounds, slight variations in analytical conditions can be compensated. The relative retention time approach, however, implies the challenging choice of one suitable standard. Therefore, due to the impossibility to fix a single standard close enough to all the analytes of interest, especially in a complex matrix, such an approach poses a problem of accuracy.

These limitations can mostly be overcome by using a retention index system.

The retention index system was first proposed by Kováts who suggested the use of a homologous series of standard compounds (i.e. n-alkanes) to fix the gas-chromatographic (GC) retention behaviour of analytes eluting in the same region of the chromatogram. In said retention index system, a retention index value is arbitrarily attributed to each standard n-alkane according to the number of carbon atoms in the alkyl chain thereof. Conventionally, in order to avoid the use of a decimal fraction, the number of carbons atoms is multiplied by 100. The retention index of a given compound is equal to the number of carbons atoms (x 100) of a hypothetical n-alkane having the same adjusted retention time of said given compound. Thus, by way of example, a compound having a retention index equal to 1090 elutes between the alkanes C10 (I=1000) and C11 (I=1100).

According to Kováts definition, the retention index (I) of a certain chemical compound is its retention time normalized to the retention times of adjacently eluting n-alkanes. Therefore, the retention index (I) calculation is performed according to the following equation:

$$I = 100\left[z + \frac{\log t'_{Ri} - \log t'_{Rz}}{\log t'_{R(z+1)} - \log t'_{Rz}}\right] \quad \text{Eq. 1}$$

wherein, $t'_{Ri}$ is the adjusted retention time of the unknown compound, $t'_{Rz}$ e $t'_{R(z+1)}$ are the adjusted retention times of the alkanes which elute, respectively, immediately before and immediately after the unknown compound i, and z represents the number of carbon atoms in the alkane chain (i.e. chain length).

The term "adjusted retention time" ($t'_R$) means the time the analyte spends distributed into the stationary phase and corresponds to the analyte retention time ($t_R$) minus the elution time of the unretained peak ($t_M$) (i.e. also known as hold-up time):

$$t'_R = t_R - t_M$$

When isothermal GC conditions are applied, this homologous series elutes with retention times increasing exponentially along with the alkanes chain length. Therefore, a semi logarithmic relationship exists between the adjusted retention time and the retention index of the reference alkanes.

In temperature programmed GC, instead, due to the fact that the n-alkane series elutes in a linear mode, which means that a linear relationship exists between retention times and retention indices, retention indices are defined as linear retention indices (hereinafter also LRIs), and are calculated by means of the following equation:

$$LRI = 100\left[z + \frac{t_{Ri} - t_{Rz}}{t_{R(z+1)} - t_{Rz}}\right] \quad \text{Eq. 2}$$

wherein, $t_{Ri}$ is the retention time of the unknown compound, $t_{Rz}$ and $t_{R(z+1)}$ are the retention times of the alkanes which elute, respectively, immediately before and immediately after the unknown compound i, and z represents the number of carbon atoms in the alkane chain.

Such approach was proposed also by using polycyclic aromatic hydrocarbons as homologous series [M. L. Lee, D. L. Vassilaros, C. M. White, M. Novotny. Anal. Chem., v. 51, p. 768 (1979)]. In this paper, Lee et al. reported also that a retention index system based on closely related compounds as internal standards was more reliable for polycyclic aromatic hydrocarbons analysis. In other words, the reproducibility of the retention indices increases if the reference compounds have chemical-physical properties similar to those of the analytes to be determined.

Other retention index systems have been described in the literature. Among them, the one that employs the fatty acid methyl esters (FAMEs) with even carbon chain number as the homologous series was commonly employed for the characterization of fatty acids samples [F. P. Woodford, C. M. Van Gent. J. Lipid Res., v. 1, p. 188 (1960); T. K. Miwa, K. L. Mikolajcazak, F. R. Earle, I. A. Wolff. Anal. Chem., v. 32, p. 1739 (1960)]. In this case, as the difference of carbon atoms between two subsequent compounds of the homologous series is equal to two, Eq. 2 is modified as follows:

$$LRI = 100\left[z + 2\frac{t_{Ri} - t_{Rz}}{t_{R(z+2)} - t_{Rz}}\right]. \quad \text{Eq. 3}$$

Therefore, a generalization for LRI calculation can be performed according to Eq. 4:

$$LRI = 100\left[z + n\frac{t_{Ri} - t_{Rz}}{t_{R(z+n)} - t_{Rz}}\right] \quad \text{Eq. 4}$$

where, z is an arbitrary number associated with the compound eluted immediately before the analyte and n represents the difference in z units between the reference compounds eluted immediately before and after the unknown analyte.

In GC, given the high reproducibility of both LRI and mass spectrometry (MS) data, the combination and complementarity of these parameters lead to an unequivocal identification. Moreover, the availability of commercial databases comprising thousands of MS spectra allows for a very fast and automatic identification process wherein LRIs are often used as a secondary filter (e.g., compounds with a high spectra matching but with a LRI value falling out from a selected range are automatically excluded from the list of possible candidates).

However, to date, an effective, reliable and high reproducible retention index system has not yet been established in liquid chromatography (LC).

Regarding the use of retention indices in liquid chromatography, several approaches have been proposed over the past years sometimes combined with UV spectral information, mainly for the identification of drugs in toxicology studies. The first attempt is ascribed to Baker and Ma [J. K. Baker, C-Y. Ma. J. Chromatogr. A, v. 169, p. 107 (1979)], who suggested the use of an alkan-2-one series (i.e. from acetone to 2-tricosanone) as homologous series reference mixture in isocratic conditions. Three years later Smith et al. [Smith, R. M. J. Chromatogr. A, v. 216, p. 313 (1982)] suggested the use of an alkyl aryl ketones homologous series, because of its higher UV absorption.

The influence of the stationary phase chemistry and packaging, as well as the mobile phase composition, was then evaluated leading to the conclusion that, due to the occurrence of significant $t_R$ deviations even under slightly different analytical conditions, a standardization of LC conditions was necessary to create a reliable identification method and a usable database in liquid chromatography.

In this regard, Bogusz et al. described the use of 1-nitroalkanes (i.e. from nitromethane to 1-nitrooctane) for retention index calculation, since, with respect to the alkyl aryl ketones series, they show a better coverage of the chromatographic space under common reversed phase (RP) conditions. Moreover, due to the fact that a gradient elution mode was employed, which is comparable to temperature program in GC, Eq. 2 was used for the retention indices calculation [M. Bogusz, R. Aderjan. J. Chromatogr. A, v. 435, p. 43 (1988)].

Nevertheless, nitroalkanes are neither affordable nor highly stable at high pH.

Moreover, as reported in WO2013/134862, retention index standards known in the art such as, for example, alkylphenones were designed mainly for LC with UV absorbance detection.

WO2013/134862 describes the use of a homologous series of 1-alkylpyridinesulfonic acids as retention indices standards for liquid chromatography, especially for LC-MS methods employing specifically electrospray (ESI) or atmospheric pressure chemical ionization (APCI) ionization systems.

In WO2013/134862, however, there is no hint about the identification of an unknown compound by means of other detectors, in particular, detectors which give no information regarding the structure of the compound such as, for example, an ELSD (evaporative light scattering detector) detector. The method described in WO2013/134862 is effective only if coupled with mass spectrometry, therefore it is not reliable in itself as identification tool in liquid chromatography. In addition, the compounds included in the homologue series have not yet been studied from a toxicological point of view and could present very high toxicity due to the presence of the pyridine ring. A further limitation of these compounds is related to their relatively limited availability in the market.

The limitations encountered by the use of each homologous series above described (such as low UV absorption, limited coverage of chromatographic space, high toxicity, poor affordability and chemical stability), and the low retention time reproducibility experimented by any change of the analytical parameters, instrumentation or even column packaging, hampered the widespread use of retention indices databases in liquid chromatography both at intra- and inter-laboratory levels.

Therefore, there is still the need for a homologous series effective as a reference mixture allowing it to establish a reliable and high reproducible method based on a novel Retention Index System for the identification of unknown compounds in liquid chromatography.

SUMMARY OF THE INVENTION

The inventors of the present invention have now surprisingly found that, when a homologous series of triacylglycerols is used as retention indices reference mixture, an advantageous LC method based on a novel Retention Index System is established allowing it to overcome the limitations of those known in the art.

Therefore, an object of the present invention is a homologous series of triacylglycerols (hereinafter also referred as TAGs) for use in liquid chromatography, wherein said series preferably comprises simple triacylglycerols composed by odd-chain fatty acids.

Provided herein is also a method for the identification of unknown compounds in liquid chromatography, wherein said method is preferably a HPLC or an UHPLC method, eventually coupled with mass spectrometry (MS). The method comprising the following steps: attribution of a retention index value to each reference TAG; chromatographic separation of a TAGs reference mixture (and, eventually, set up of a calibration curve to extrapolate the retention time of reference TAGs not comprised in the selected reference mixture); chromatographic separation of unknown compounds in a sample; determination of the retention index value of each separated unknown compound (eventually by using also extrapolated $t_R$ values for reference TAGs eluted outside the chromatographic space covered by the selected homologous series); and identification of the unknown compounds by comparison of the resulting LRI values with those of listed compounds.

Further provided herein is a library (i.e. database) of retention indices useful for the identification of unknown compounds in liquid chromatography.

Further provided herein is a software, called CromatoplusSpectra, which has been suitably developed to make automatic and fast the identification process, only based on the match of the LRI value of an unknown compound with those of the LRI library (or database) previously established.

DEFINITIONS

Figure 1:
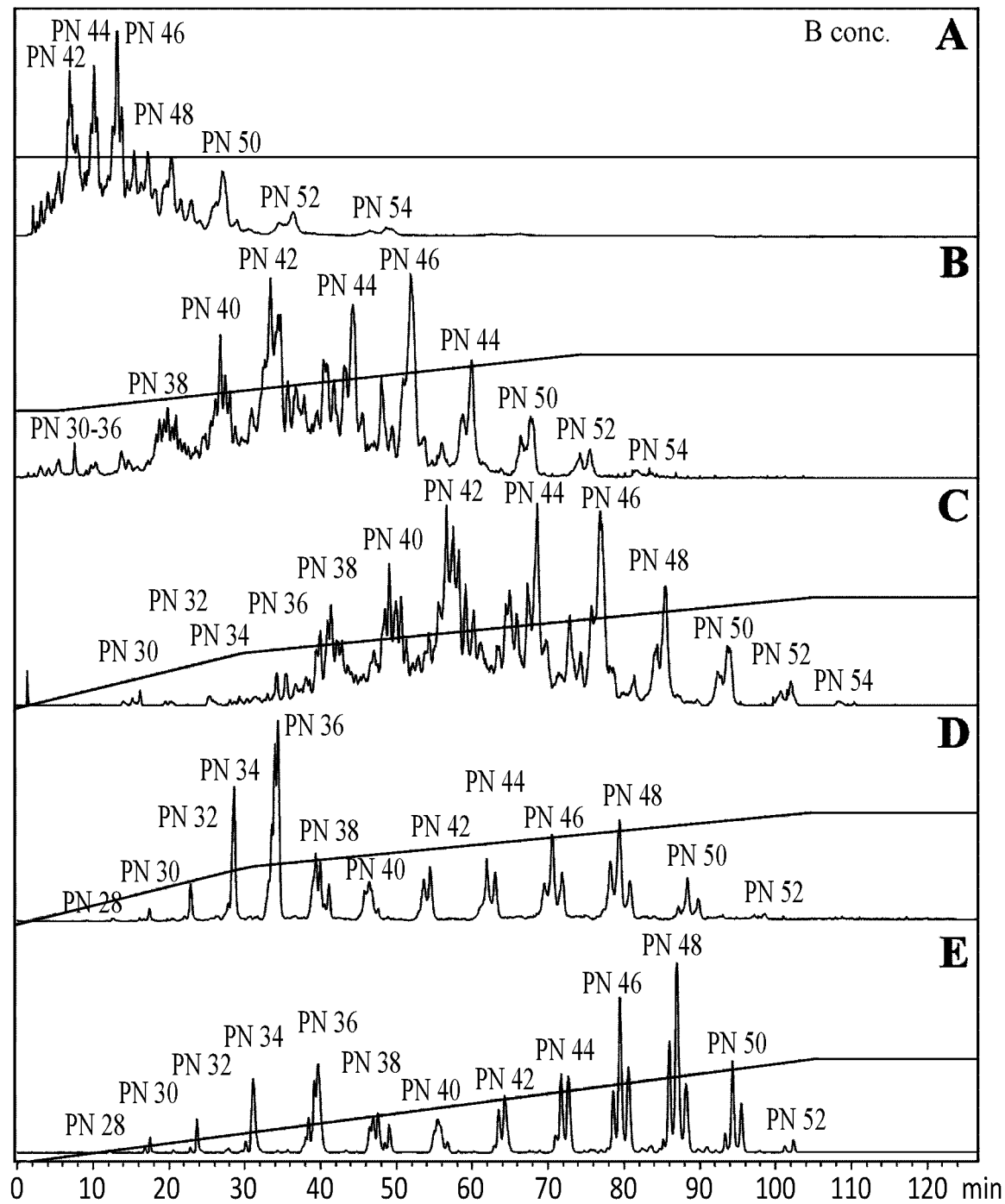
FIG. 1: UHPLC-ELSD method development steps: A) chromatogram of cod liver oil under isocratic conditions (40% solvent B); B) chromatogram of cod liver oil under 70 min linear gradient (20-50% B) with 5 min isocratic step (20% solvent B); C) chromatogram of cod liver oil under multi-step gradient elution (0-25% B in 30 min and 25-50% B in 75 min); D) chromatogram of butter sample under multi-step gradient elution (0-25% B in 30 min and 25-50% B in 75 min); E) chromatogram of butter sample under 105 min linear gradient (0-50% B).

The term "homologous series" refers to a series of compounds with the same general formula varying only in the number of methylene groups in an alkyl chain. In other words, successive members differ in mass by an extra methylene bridge (i.e. —$CH_2$—) inserted in the chain. Adjacent members in this series are known as "adjacent homologues".

For the purpose of the present invention, when triacylglycerols composed by odd-chain fatty acids are preferred, adjacent members (or adjacent TAGs) such as, for example, trinonanoin (C9C9C9) and triundecanoin (C11C11C11), differ in mass by six extra methylene bridges.

The term "reference mixture" refers to the group of compounds that are part of the homologous series selected as standards for the purpose of the present invention.

DETAILED DESCRIPTION OF THE INVENTION

A first object of the present invention is a homologous series of triacylglycerols for use in liquid chromatography, wherein said series preferably comprises simple triacylglycerols composed by odd-chain fatty acids.

Triacylglycerols were selected as main target analytes because of their biological importance and very regular liquid chromatographic profile, especially in reverse phase liquid chromatography (RP-LC), and since they have never been considered before in similar studies.

Here below a triacylglycerol general structure is reported:

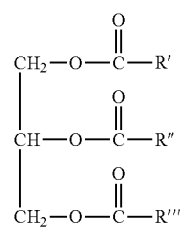

wherein,

R', R" and R''', taken together or alone, can be the same or a different straight alkyl chain.

Triacylglycerols of the present invention can be simple or mixed TAGs. Simple TAGs comprise only one kind of fatty acid (i.e. R', R", R''' are the same) while mixed TAGs comprise two or three different fatty acids (i.e. two or three among R', R", R''' are different). Preferably, reference triacylglycerols of the homologous series are simple TAGs. Each fatty acid can be saturated or unsaturated and may contain one, two or three unsaturations. Preferably, reference triacylglycerols of the homologous series are saturated TAGs. Triacylglycerols of the present invention may comprise both even- and odd-chain fatty acids. Preferably, reference triacylglycerols of the homologous series comprises odd-chain fatty acids.

Reference triacylglycerols of the present invention are commercially available. Alternatively, they can be readily synthetized either by esterification reaction of glycerol with three suitable fatty acids or by transesterification reaction of glycerol with three suitable esters.

Since the homologous series employed has to cover the expected retention times of all possible analytes, reference triacylglycerols of the present invention have been selected so that they cover a wide range of retention times.

In one embodiment of the present invention, the reference homologous series comprises, but is not limited to, triacylglycerols ranging from triheptanoin (C7C7C7) to triheneicosanoin (C21C21C21) or any portion thereof.

For the purpose of the present invention in fact, any portion of said homologous series of adjacent TAGs is suitable as reference mixture, provided that it comprises at least two adjacent TAGs selected from the group consisting of, but not limited to, the followings: triheptanoin (C7C7C7), trinonanoin (C9C9C9), triundecanoin (C11C11C11), tritridecanoin (C13C13C13), tripentadecanoin (C15C15C15), triheptadecanoin (C17C17C17), trinonadecanoin (C19C19C19) and triheneicosanoin (C21C21C21).

In a preferred embodiment of the present invention, the reference homologous series comprises triacylglycerols ranging:
  from triheptanoin (C7C7C7) to trinonadecanoin (C19C19C19); or
  from trinonanoin (C9C9C9) to trinonadecanoin (C19C19C19); or from trinonanoin (C9C9C9) to triheneicosanoin (C21C21C21); or any portion thereof.

Figure 3:
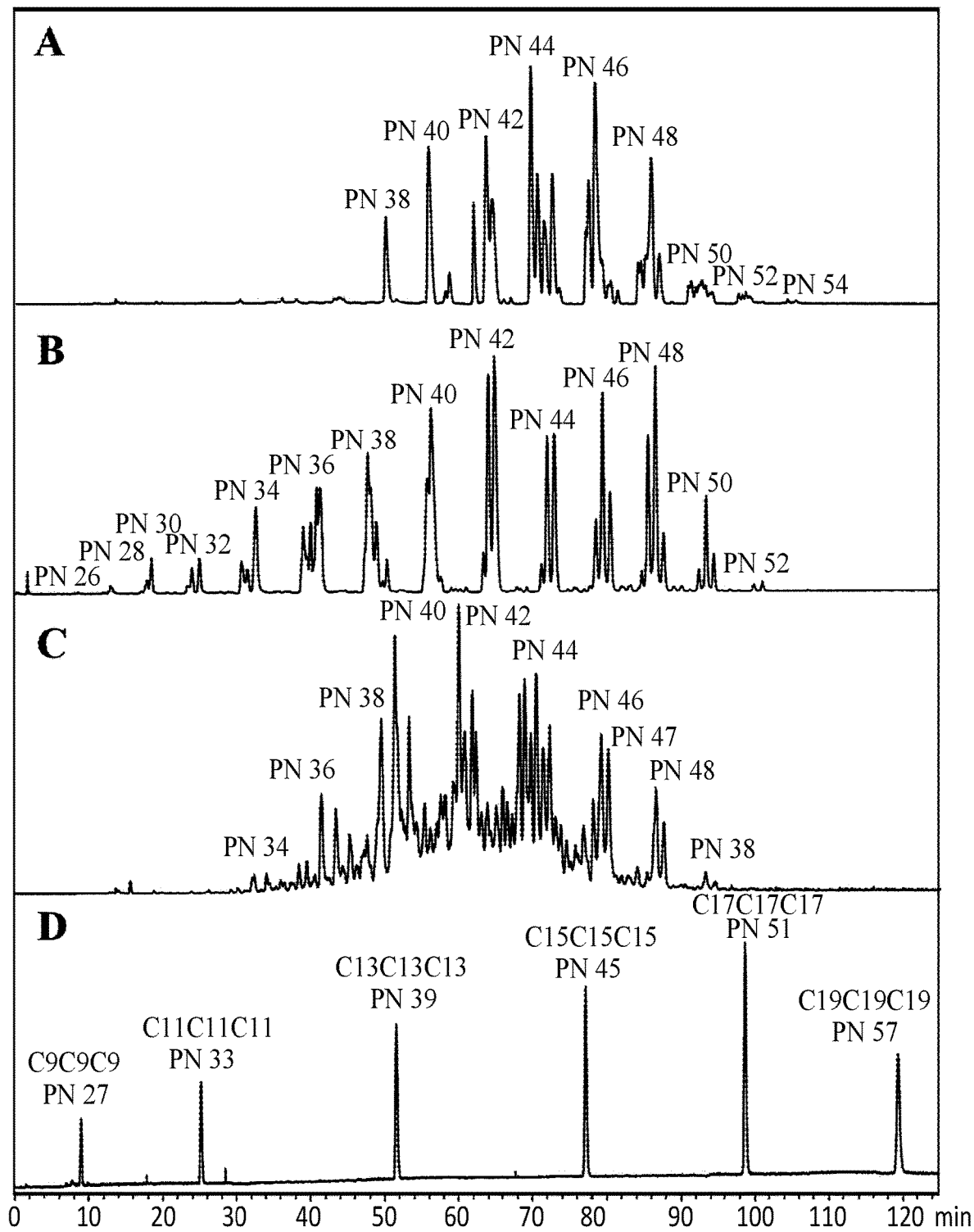
FIG. 3: UHPLC-ELSD selected chromatograms acquired by using the final developed method: A) borage oil; B) goat milk; C) menhaden oil; D) reference homologue series.

In particular, the reference mixture ranging from C9C9C9 to C19C19C19 largely covers the chromatographic space in which lipid samples, relevant from an alimentary point of view, generally fall. More in particular, they cover almost all the chromatogram, from about 9 to about 120 min with a homogeneous distribution, as shown in FIG. 3D.

In addition, the reference mixtures above disclosed can be extended either to shorter-chain triacylglycerols (e.g., to triformin, C1C1C1) or longer-chain triacylglycerols according to the chromatographic method and/or sample composition employed.

Mainly due to its optimal coverage of chromatographic space and to the fact that it is not affected by chromatographic analytical conditions, the reference TAGs homologous series makes the Retention Index System of the present invention reproducible both at intra- and inter-laboratory levels.

Further provided herein is a kit for use in liquid chromatography comprising a homologous series of triacylglycerols.

Preferably, the kit comprises a reference homologous series comprising simple triacylglycerols composed by odd-chain fatty acids.

In one embodiment, the kit comprises a reference homologous series comprising, but not limited to, triacylglycerols ranging from triheptanoin (C7C7C7) to triheneicosanoin (C21C21C21), or any portion thereof.

For the purpose of the present invention, the kit can comprise any portion of said homologous series, provided that it comprises at least two adjacent TAGs selected from the group consisting of, but not limited to, the followings: triheptanoin (C7C7C7), trinonanoin (C9C9C9), triundecanoin (C11C11C11), tritridecanoin (C13C13C13), tripentadecanoin (C15C15C15), triheptadecanoin (C17C17C17), trinonadecanoin (C19C19C19) and triheneicosanoin (C21C21C21).

In a preferred embodiment of the present invention, the kit comprises a reference homologous series comprising, but not limited to, triacylglycerols ranging:
from triheptanoin (C7C7C7) to trinonadecanoin (C19C19C19); or
from trinonanoin (C9C9C9) to trinonadecanoin (C19C19C19); or
from trinonanoin (C9C9C9) to triheneicosanoin (C21C21C21); or any portion thereof.

In addition, the kit of the present invention can comprise a homologous series such that each of the reference homologous series above disclosed, or a portion thereof, can be extended either to shorter-chain triacylglycerols (e.g., to triformin, C1C1C1) or longer-chain triacylglycerols, according to the chromatographic method and/or sample composition employed.

Said kit can comprise the TAGs homologous series either in the form of individual vials, each comprising a reference TAG, or as a unique vial comprising the TAGs reference mixture according to the present invention. Each reference TAG and/or the TAGs reference mixture can be in a solid dried form or as a ready-to-use solution to be introduced into the LC system previously or together with the unknown compound (i.e. analyte).

Preferably, the kit provides the TAGs reference mixture as a ready-to-use solution in a suitable solvent, to be introduced in the LC system previously or together with the unknown compound, after a simple dilution in a suitable solvent.

Practically, the kit provides the TAGs reference mixture as a ready-to-use solution in 2-propanol at a concentration of, but not limited to, 1000 mg/L for each TAG, to be introduced in the LC system previously or together with the unknown compound (i.e. analyte), after a simple dilution in 2-propanol.

The standard mixture of selected triacylglycerols (i.e. homologous series) is preferably prepared in a concentration range 50-1000 mg/L, depending on the employed detector, viz. on its sensitivity: a concentration of 50-100 mg/L is used when MS detector are employed, while higher concentrations are employed for less sensitive ELSD or UV detectors. Then, the homologous series can be used both as external and internal standard.

In the first case, such TAGs standard mixture is injected into a liquid chromatography system in order to separate each reference triacylglycerol. The resulting chromatogram forms the reference pattern of triacylglycerols useful as external standard for subsequent qualitative analysis.

The reference triacylglycerols of the present invention can also be used as internal standard by co-injection with the sample whose analytes are to be identified. In case of very complex matrices, however, the external standards approach should be preferred in order to avoid the chromatogram to be over-populated also with reference peaks. This, in fact, may pose a problem of resolution.

A further object of the present invention is the development of a method for the identification of unknown compounds in liquid chromatography based on a TAGs Retention Index System, wherein said method is in particular a high performance liquid chromatography (HPLC) or an ultra-high performance liquid chromatography (UHPLC) method able to maximize the baseline separation of lipid compounds in real-world samples.

More specifically, a preferred object of the present invention is the development of an UHPLC method able to maximise the baseline separation of lipid compounds in real-world lipid samples effective and reliable for the univocal identification of unknown compounds with, and even without, the complementarity of mass spectrometry.

Therefore, a method for the identification of unknown compounds in liquid chromatography is herein described, the method comprising the following steps:
a. attribution of a retention index value to each reference TAG;
b. chromatographic separation of a TAGs reference mixture;
c. chromatographic separation of unknown compounds in a sample;
d. determination of the retention index value of each separated unknown compound;
e. identification of the unknown compound.

Since it allows for the conversion of retention times into system-independent constants, the novel Retention Index System here disclosed can be used independently from the selected instrumentation and analytical conditions.

With respect to step a., as above disclosed, it is known from the literature that a retention index value can be arbitrarily attributed to an organic compound according to the number of carbon atoms in the alkyl chain thereof.

Therefore, for the purpose of the present invention, to each reference TAG of the claimed homologous series, a retention index value was arbitrarily attributed according to the following:

$$LRI_{std} = 100 \times PN$$

wherein,

PN (Partition Number) is related to the carbon chain length (CN) and double bond number (DB) of the fatty acids bound to the glycerol backbone, according to the following equation:

$$PN=CN-2DB$$

By way of example, $LRI_{std}$ is equal to 2100 for triheptanoin (C7C7C7), 2700 for trinonanoin (C9C9C9), 3900 for tritridecanoin (C13C13C13), 5700 for trinonadecanoin (C19C19C19) etc.

In detail, the chromatographic separation of both step b. and c. can be carried out by using either an HPLC or an UHPLC system. In the first case, analyses were carried out by using an HPLC system, for example, a Waters Alliance HPLC system (Waters Associates Inc) optionally coupled to a mass spectrometer, such as an electrospray ionization mass spectrometer (i.e. ESI-MS). In the second case, analyses were carried out by using an UHPLC system, for example, a Nexera X2 system (Shimadzu) coupled with a suitable detector. For the purpose of the present invention suitable detectors can be destructive or non-destructive detectors selected among, but not limited to, the following: evaporative light scattering detector (ELSD), ultraviolet detectors, both UV and photodiode array detectors, mass spectrometers by both atmospheric pressure interfaces (API) or electron ionization (EI) source. The ELSD is preferred. Additionally, in the event that the chromatograph is coupled with a mass spectrometer, suitable API interfaces can be electrospray (ESI), atmospheric pressure chemical ionization (APCI) or atmospheric pressure photoionization (APPI), all suitable for TAGs analysis.

As regard the analytical conditions, the inventors of the present invention have succeeded in establishing a method almost independent from both the chromatographic instrumentation and the conditions employed.

The only feature that affects the method and, in particular, the method reproducibility is the mobile phase. In fact, for the chromatographic separation of both step b. and c., the selected mobile phase comprises acetonitrile (hereinafter also referred as solvent A) and 2-propanol (hereinafter also referred as solvent B). The inventors, however, have surprisingly found that this mobile phase (i.e. acetonitrile/2-propanol mobile phase), operated in gradient elution, preferably in linear gradient elution, allows to obtain an optimal compromise between chromatographic resolution (i.e. a peak capacity value of about 162) and analysis time (i.e. about 125 min), as far as we know, the best ever reached so far for very complex samples, such as fish oil and dairy products.

Furthermore, the toxicity of both acetonitrile and 2-propanol is by far lower than other solvent employed in previous methods, such as dichloromethane or acetone, characterized inter alia from very high volatility.

Another issue was the selection of the maximum percentage of the strongest solvent (i.e. 2-propanol). After extensive experimentation, the inventors found that, under isocratic conditions, a percentage of 2-propanol between 40% and 60%, preferably between 45% and 55%, and more preferably equal to 50%, was sufficient to completely elute all the compounds (FIG. 1A) in one of most complex real-world samples, namely a cod liver oil. In order to improve the chromatographic method, a gradient elution program was then carefully evaluated aiming to maximise the baseline separation of complex real samples.

Suitable gradient programs have been settled up, in particular the following:

i. 0-5 min, 20% B, 75 min to 50% B (FIG. 1B) which however shows a poor resolution at the low partition number (PN) regions (i.e. from about 30 to about 36) and the presence of several co-elutions in the richest PN region, namely PN 42.
ii. 0-30 min, 0-25% B, 30-105 min to 50% B (FIG. 10) by means of which a clear separation between 30, 32 and 34 PN regions was achieved, as well as a major resolution in each PN region; and finally
iii. a linear gradient 0-50% B in 105 min (FIG. 1E).

The latter, i.e. iii., resulted in a great improvement of the present chromatographic method reaching a better resolution, an improved peak shape, showing more uniform and narrower peak widths (see FIG. 1E with respect to FIG. 1D), and an optimal time of analysis.

For these reasons, such linear gradient acetonitrile/2-propanol represents the best suited to the method of the present invention, in particular with respect to the chromatographic separation of both step b. and c.

With the aim of maximizing the separation, the inventors also took carefully into consideration the temperature. Three temperatures were evaluated, in the range 30-40° C. (i.e. 30° C., 35° C., and 40° C.), leading to the conclusion that, in said range, the method is readily reproducible. However, a temperature of 35° C. is preferred. The experiments provided herein show also that the method of the present invention is independent from analytical conditions and chromatographic instrumentation such as, for example, column dimensions, stationary phase packing, flow rate and gradient steepness of the mobile phase (see Evidence of the method independency: repeatability studies).

The method claimed is as independent as possible from analytical conditions allowing to conclude that the Retention Index System of the present invention, and the database based thereon, are usable in samples identification at both intra- and inter-laboratory level.

The reference mixture of step b. preferably comprises simple triacylglycerols composed by odd-chain fatty acids which represent the reference homologous series of the novel Retention Index System according to the present invention.

Figure 2:
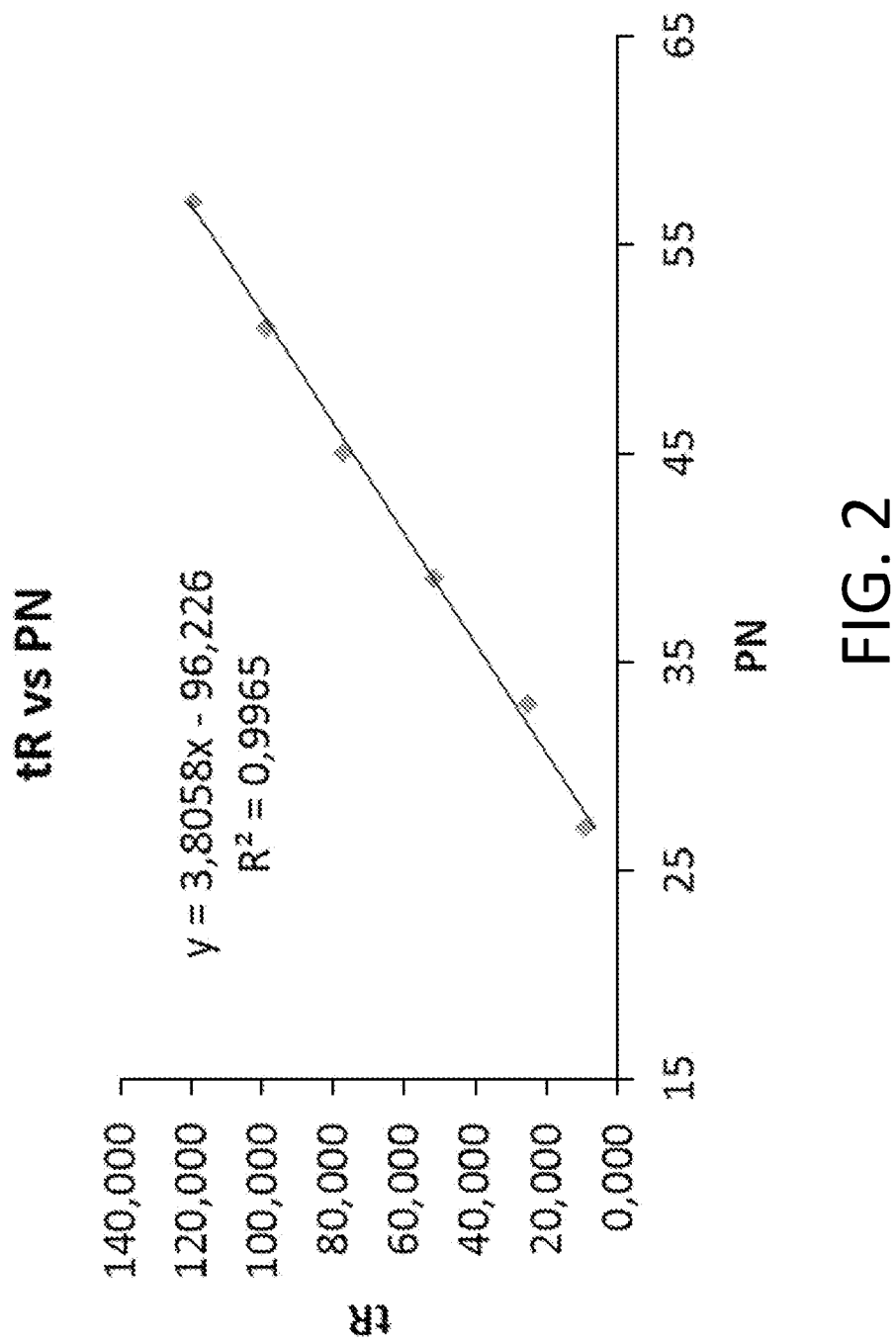
FIG. 2: Calibration curve $t_R$ vs PN for the reference TAGs comprised in one of the homologue series (from C9C9C9 to C19C19C19).

Step b. can further comprise the eventual set up of a calibration curve $t_R$ vs. PN. In detail, given the linear relationship between $t_R$ and PN, it is possible to build a plot using the PN value of the reference TAGs in step a. and the retention times obtained in step b (FIG. 2).

Having regard to step c., "chromatographic separation" is to be understood as disclosed in step b., whereas the term "sample" means a real world sample, more specifically a real world lipid sample ranging, for example, from very simple vegetable oils to more complex fish oils, milk and milk-derived lipid samples such as, but not limited to, the following: vegetal oils, aquatic organisms (e.g. fish and algae) and derivatives thereof (e.g. fishmeal and fish oils), dairy products and biological samples as whole blood, plasma and cell membranes.

As regards the determination of the retention index value of step d., it can be performed by means of Eq. 4 (reported here below), by using the odd-chain TAGs as reference homologous series according to the present invention (e.g., from C9C9C9 to C19C19C19).

$$LRI = 100\left[z + n\frac{t_{Ri} - t_{Rz}}{t_{R(z+n)} - t_{Rz}}\right] \qquad \text{Eq. 4}$$

wherein, $t_{Ri}$ is the retention time of the unknown compound i, $t_{Rz}$ and $t_{R(z+1)}$ are the retention times of the TAGs which elute, respectively, immediately before and immediately after the unknown compound i, z is the PN associated with the compound eluted immediately before the unknown compound i, and n represents the difference in z units between the reference TAGs eluted immediately before and after the unknown compound i.

As above anticipated, for the purpose of the present invention, z is equal to the PN of each reference TAG. Therefore, by way of example, z is 27 for C9C9C9, up to 57 for C19C19C19.

Furthermore, since the difference in z units between two adjacent homologues is equal to 6, n is to be taken as 6 when using Eq. 4 for the calculation of LRIs.

Step d. can further comprise the extrapolation of retention times by means of the calibration curve $t_R$ vs. PN established in step b (FIG. 2). In detail, given the linear relationship between $t_R$ and PN, it is possible to extrapolate the retention time of a reference compound not included in the employed homologue series (for example, PN minor than 27 or major than 57). More in particular, given the retention time of the unknown compound (step c.), it is possible to extrapolate the retention times and PN of both the reference TAG which elutes immediately before and after the unknown compound. Therefore, it will be possible to use such retention times and/or PN in equation 4 to calculate the LRI value of a compound eluted outside the chromatographic space covered by the homologous series.

In another embodiment of the present invention, step d. can also be performed by means of the CromatoplusSpectra software, which automatically extrapolates retention indices for peaks eluted outside the chromatographic space covered by the homologous series. Such an extrapolation, again, is based on the direct proportionality/linearity between $t_R$ and PN, and can be also easily performed by each operator on an excel file.

The identification step e. is performed by comparison of the calculated LRI value for the unknown compound with those previously obtained for listed compounds; if the calculated LRI of an unknown peak is the same of a reference, then a positive identification can be made.

The term "listed compounds" comprises, but is not limited to, those established in step a. (i.e. LRI values of the reference TAGs). Said term in fact also comprises retention index values of all the compounds analysed by means of the present chromatographic method which have become part of the retention index library of the present invention (i.e. the LRI database comprising more than 209 TAGs and other simple and complex lipids such as, for example, free fatty acids, mono- and diacylglycerols (MAGs and DAGs, respectively), as well as sterols, carotenoids and waxes).

In another embodiment of the present invention, the identification step e. can be performed by means of the CromatoplusSpectra software, which has been suitably developed to make automatic and fast the identification process only based on the match of the LRI value of an unknown compound with those of the LRI library previously established. The identification process by the new software consists of the following steps: peak integration in the chromatogram of the homologue series peaks to define their retention time; peak integration in the chromatogram of the real sample; loading in the LRI data processing window of the homologue series chromatogram previously integrated; loading of the LRI library (normally an excel file comprising just compound name and LRI value); LRI calculation for each unknown compound; match with the LRI library by one simple click; then a list of candidates is obtained depending on the LRI tolerance window set in the software.

Regarding the chromatographic separation, in a preferred embodiment, the method comprises an UHPLC system equipped with two serially coupled narrow-bore columns (100×2.1 mm (L×ID)) wherein the stationary phase packing consists of sub-2 μm $d_p$ monodisperse particles and the mobile phase is acetonitrile(A)/2-propanol(B) under gradient conditions: 0-50% B in 105 min (held for 20 min). The flow rate is maintained at 400 μL/min with oven temperature of 35° C. As for the detection conditions, in a preferred embodiment, an ELSD detector is employed and the following ELSD parameters were applied: evaporative temperature 60° C., nebulizing gas ($N_2$) pressure 270 kPa, detector gain 166<1 mV; sampling frequency: 10 Hz.

Figure 4:
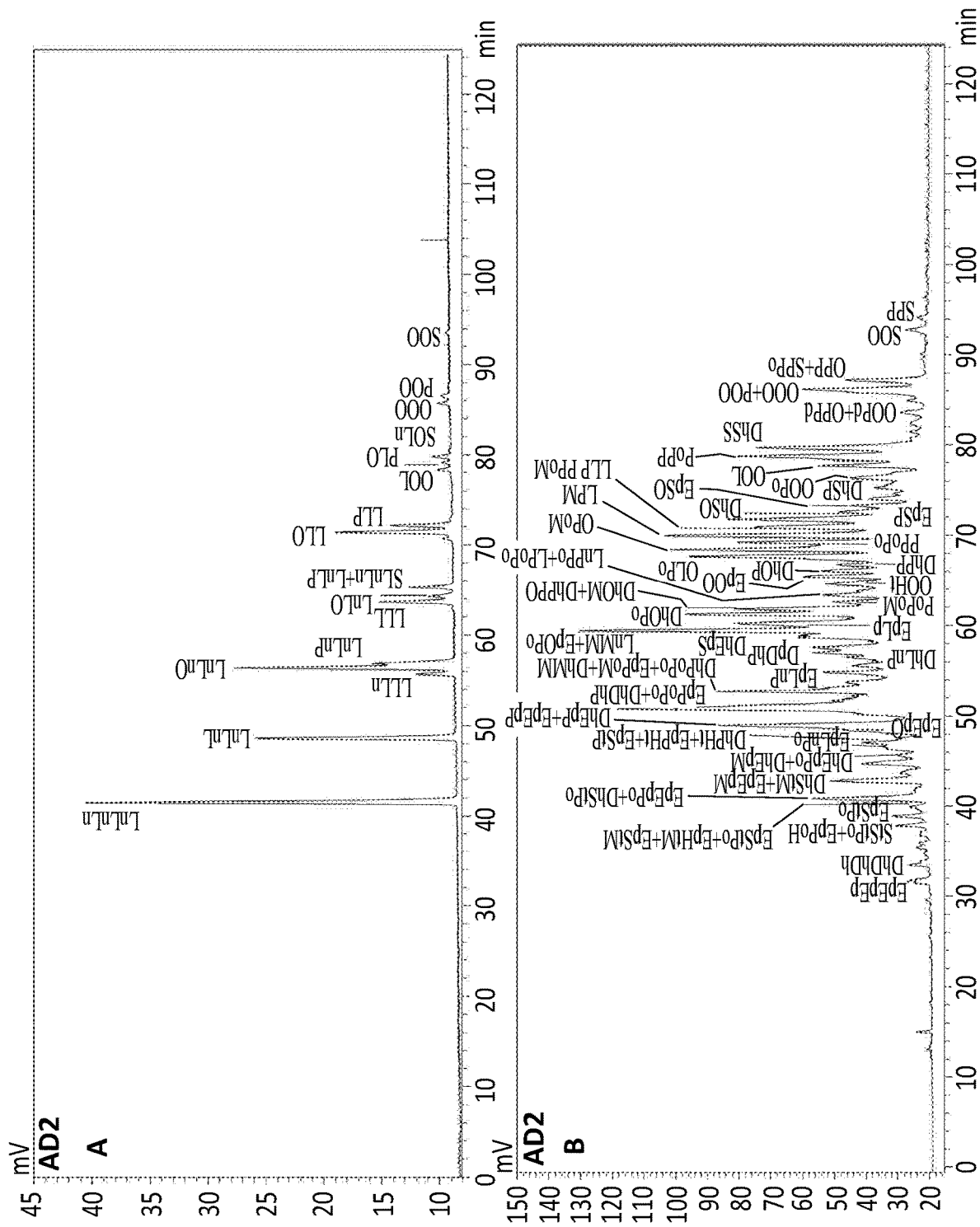
FIG. 4: Chromatograms of identified A) linseed oil and B) menhaden oil.

The chromatogram of borage oil, menhaden oil and goat milk are reported in FIGS. 3A, 3B and 3C, respectively, in direct comparison with the reference homologue series chromatogram (FIG. 3D); an immediate identification (even by visual inspection) according to the partition number is shown, in order to highlight the inter sample repeatability in terms of retention time of each PN region, in spite of total different elution profiles. Moreover, the chromatograms of linseed oil, one of the most complex vegetable oil injected, and menhaden oil, the sample with the largest number of identified TAGs, are shown in FIG. 4, in order to point out the high chromatographic effectiveness of the present method.

Table 1 below provides the list of abbreviations used to refer to the plurality of fatty acids in the analysed compounds.

TABLE 1

| Abbreviation | Fatty Acid |
|---|---|
| C7 | heptanoic acid |
| C9 | nonanoic acid |
| C11 | undecanoic acid |
| C13 | tetradecanoic acid |
| C15 | pentadecanoic acid |
| C17 | heptadecanoic acid |
| C19 | nonadecanoic acid |
| Bu | butirric acid |
| Cp | caproic acid |
| C | caprylic acid |
| Ca | capric acid |
| La | lauric acid |
| M | myristic acid |
| Pd | pentadecanoic acid |
| Ht | hexadecatrienoic acid |
| Po | palmitoleic acid |
| P | palmitic acid |
| St | stearidonic acid |
| Ln | linolenic acid |
| γLn | gamma-linolenic acid |
| L | linoleic acid |
| O | oleic acid |
| S | stearic acid |
| G | gadoleic acid |
| A | arachidic acid |
| Ep | eicosapentaenoic acid |
| Dh | docosaesaenoico acid |
| C22:1 | docosenoic acid |
| C24:1 | tetracosenoic acid |

Figure 5:
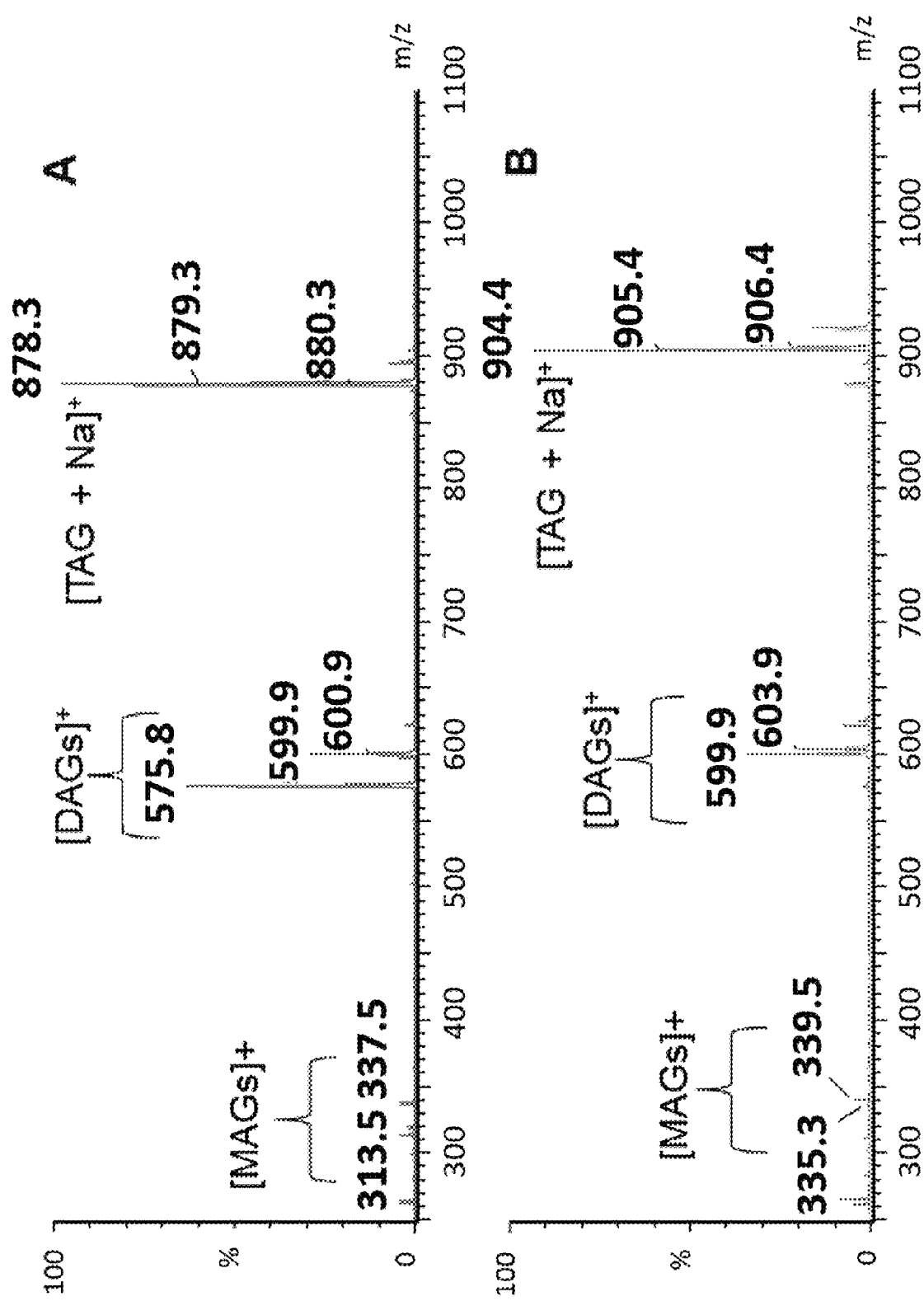
FIG. 5: ESI-MS spectrum of A) LLP and B) OOLn, with fragment elucidation. MAGs: monoacylglycerols; DAGs: diacylglycerols; TAG+Na+: sodium adduct of triacylglycerol.

The identification based solely on the Retention Index System of the present invention is reliable in itself and leads to unequivocal identification (i.e. no retention indices superimposition occurs). However, sometimes, the obtained LRI value can positively match with more than one reference compound. This is the case of dilinoleyl-palmitoyl-glycerol (LLP), having a LRI of 4360±6, and dioleyl-linolenyl-glycerol (OOLn), having a LRI of 4358±2. Therefore, in order to avoid ambiguous identification, step e. can further comprise the inspection of the MS fragmentation pattern of each species, leading to the selection of the right candidate. FIG. 5 shows ESI-MS spectra of LLP (FIG. 5A) and OOLn (FIG. 5B) species, along with their fragment elucidation. In detail, each TAG shows a fragmentation profile characterized by the sodium adduct of the molecular species, diacylglycerols and monoacylglycerols fragments, leading to unequivocal identification. Going into the detail of this aspect of the invention, when an LC-MS system is employed, the same software is employed for the identification process, by adding one further step that is the interpretation of the MS spectrum that can be visualized by one simple click on the peak. In the near future, also a spectral library could be created and used as automatic identification tool in combination to the LRI database. In this case the software should be able to apply simultaneously both the identification filters to provide only the right candidate.

Conversely, the method of the present invention can also be used to discriminate compounds having very similar or identical mass spectra. In summary, using retention indices in liquid chromatography coupled with MS, particularly EI-MS or API-MS, significantly increase the reliability of peak identifications by providing a second, independent experimental value. Therefore, it is possible to conclude that, according to the present invention, retention indices are not only essential parameters to perform automatic and fast searches in the LRI database, but they can also become complementary to MS allowing to discriminate between analytes with the same mass fragmentations, thus achieving a highly reliable identification.

It is worth noting also that, to date, lipid profiling is commonly investigated by considering in a complementary way the GC profiles of fatty acid methyl esters (FAMEs) and LC profiles of intact lipids. In this way, the identification of intact lipids can be driven by the FA composition; in other words isobars (identical MS spectra) can be distinguished by considering the relative abundance of FAs, which are combined in the acylglycerols (MAGs, DAGs and TAGs) and phospholipids and present in sterol esters, carotenoid esters, waxes. Furthermore, for very simple samples, MS information could be not essential, being known FA composition and considering the typical elution profile of lipids under RP-LC. In fact, in RP-LC lipids are eluted according to the increasing PN, then a preliminary identification could be performed on the basis of the retention behavior. Nevertheless when considering complex samples, such as fish oils or milk and milk derived samples, many exceptions can be observed due to the unpredictable retention behaviour of highly polyunsaturated and short chain saturated fatty acids, which can be retained more weakly and elute in lower PN region of the chromatogram.

To this regard, providing for a retention index value associated to each lipid, the method of the present invention represents a more reliable identification tool.

As above anticipated, according to the present invention, there is further provided a library (i.e. database) of retention indices for listed compounds usable as effective identification tool in liquid chromatography.

The retention index database was built by using the CromatoplusSpectra software (Chromaleont, Messina, Italy) which, since a linear relationship exists between retention index and chain length, is able to extrapolate LRI values for TAGs eluted earlier than C9C9C9 (down to triformin, C1C1C1) and subsequent to C19C19C19. Then, the analyses were processed by using the CromatoplusSpectra software, which allowed to directly match the LRI automatically calculated for each peak with those of the LRI database previously created. Since it returns a list of candidates as narrow as possible, it is possible to perform the search resting only upon the LRI database and/or without consider any spectral data. Moreover, the software was successfully tested on LC analysis carried out with different types of instrumentation (e.g., HPLC, UHPLC, nanoLC) coupled with different types of detectors (e.g., ELSD, API-MS, EI-MS etc.).

As previously disclosed, the inventors were successful in finding an adequate reference mixture that covers all the analysis time and shows a regular elution profile under different experimental conditions.

Therefore, due to both the regular retention behaviour of the TAGs homologous series and the robustness of the method of the present invention herein disclosed, it has been possible to build Table 2.

Table 2 contains the list of all identified compounds, ordered according to their elution time, along with their PN and calculated LRI reported as confidence interval around the inter sample average. The absolute experimental maximum difference from the average ($\Delta$LRI) is also reported and may be considered for the database search. The confidence interval was estimated at the 95% confidence level using a normal probability distribution, assuming that the uncertainty of the method is equal to the average of all the standard deviations obtained for each LRI value. Such assumption derives from the fact that the standard deviation distribution can be approximated to a Pearson chi-square ($\chi^2$) function. Therefore it is not related to the measured variable but only to its degrees of freedom, which correspond to the dimension or population of the same variable. In this specific situation the population (p) of the LRI value, indicated in bracket in Table 2 here below, corresponds to the number of samples (each in duplicate since two analyses were performed for each sample) comprising the specific compound.

TABLE 2

List of identified compounds, along with their PN, LRI and $\Delta$LRI value

| PN | Compound Name | LRI* | $\Delta$LRI |
|---|---|---|---|
| 14 | L (p = 10)[#] | 2451 ± 3[a] | 6 |
| 16 | O (p = 10)[#] | 2459 ± 3[a] | 6 |
| 16 | P (p = 10)[#] | 2519 ± 3[a] | 8 |
| 18 | S (p = 10)[#] | 2552 ± 3[a] | 9 |
| 26 | CaCC (p = 2) | 2691 ± 6[a] | 4 |
| 26 | CaCaCp (p = 2) | 2691 ± 6[a] | 4 |
| 26 | LaCCp (p = 2) | 2691 ± 6[a] | 4 |
| 28 | LaCaCp (p = 2) | 2800 ± 6 | 4 |
| 28 | MCCp (p = 2) | 2800 ± 6 | 4 |
| 28 | OCBu (p = 6) | 2816 ± 4 | 10 |
| 28 | PCBu (p = 6) | 2816 ± 4 | 10 |
| 28 | LnO (p = 10)[$] | 2953 ± 3 | 11 |
| 30 | MCaCp (p = 10) | 2969 ± 3 | 13 |
| 30 | PCCp (p = 10) | 3003 ± 3 | 13 |
| 30 | OCaBu (p = 10) | 3003 ± 3 | 13 |
| 30 | PCaBu (p = 10) | 3003 ± 3 | 13 |
| 30 | MLaBu (p = 10) | 3003 ± 3 | 13 |
| 30 | OCpC (p = 2) | 3014 ± 6 | 2 |
| 30 | LO (p = 10)[$] | 3123 ± 3 | 6 |
| 30 | PL (p = 10)[$] | 3153 ± 3 | 4 |
| 32 | LaCaCa (p = 6) | 3209 ± 4 | 5 |
| 32 | MCaC (p = 4) | 3223 ± 4 | 11 |
| 32 | PLaBu (p = 8) | 3241 ± 3 | 10 |
| 32 | MLaCp (p = 4) | 3241 ± 4 | 10 |
| 32 | PCaCp (p = 10) | 3243 ± 3 | 11 |

TABLE 2-continued

List of identified compounds, along with their PN, LRI and ΔLRI value

| PN | Compound Name | LRI* | ΔLRI |
|---|---|---|---|
| 32 | PCC (p = 2) | 3249 ± 6 | 1 |
| 32 | LLBu (p = 2) | 3292 ± 6 | 0 |
| 32 | PoPoBu (p = 2) | 3292 ± 6 | 0 |
| 32 | OO (p = 10)$ | 3336 ± 3 | 4 |
| 32 | PO (p = 10)$ | 3362 ± 3 | 1 |
| 34 | PCaC (p = 8) | 3414 ± 3 | 6 |
| 34 | MCaCa (p = 10) | 3416 ± 3 | 10 |
| 34 | OCaC (p = 2) | 3426 ± 6 | 0 |
| 34 | OLBu (p = 6) | 3441 ± 4 | 4 |
| 34 | LaLaCa (p = 2) | 3443 ± 6 | 0 |
| 34 | MLaC (p = 2) | 3443 ± 6 | 0 |
| 34 | OMBu (p = 10) | 3454 ± 4 | 10 |
| 34 | PMBu (p = 10) | 3454 ± 4 | 10 |
| 30 | EpEpEp (p = 2) | 3463 ± 6 | 0 |
| 30 | DhDhDh (p = 2) | 3500 ± 6 | 0 |
| 34 | SO (p = 6)$ | 3568 ± 3 | 7 |
| 36 | OCaCa (p = 10) | 3596 ± 4 | 8 |
| 36 | OLaC (p = 6) | 3597 ± 3 | 7 |
| 34 | SP (p = 6)$ | 3599 ± 3 | 5 |
| 34 | StStPo (p = 2) | 3600 ± 6 | 1 |
| 34 | EpPoHt (p = 2) | 3600 ± 6 | 1 |
| 36 | PPoCp (p = 8) | 3604 ± 3 | 9 |
| 36 | PCaCa (p = 10) | 3604 ± 3 | 9 |
| 36 | OLCp (p = 2) | 3615 ± 6 | 1 |
| 36 | OOBu (p = 8) | 3620 ± 3 | 10 |
| 36 | OMCp (p = 6) | 3622 ± 4 | 8 |
| 34 | EpStPo (p = 2) | 3624 ± 6 | 1 |
| 36 | MMC (p = 2) | 3625 ± 6 | 1 |
| 36 | MLaCa (p = 2) | 3625 ± 6 | 1 |
| 36 | LaLaLa (p = 2) | 3625 ± 6 | 1 |
| 36 | OPBu (p = 10) | 3630 ± 3 | 10 |
| 36 | PPBu (p = 10) | 3630 ± 3 | 10 |
| 34 | EpHtM (p = 2) | 3649 ± 6 | 1 |
| 34 | EpStM (p = 2) | 3649 ± 6 | 1 |
| 36 | PMCp (p = 2) | 3655 ± 6 | 1 |
| 36 | LnLnLn (p = 6) | 3668 ± 4 | 5 |
| 34 | EpEpPo (p = 2) | 3669 ± 6 | 1 |
| 34 | DhStPo (p = 2) | 3669 ± 6 | 1 |
| 34 | DhStM (p = 2) | 3712 ± 6 | 1 |
| 34 | EpEpM (p = 2) | 3712 ± 6 | 1 |
| 36 | γLnγLnγLn (p = 2) | 3747 ± 6 | 1 |
| 34 | DhEpPo (p = 2) | 3755 ± 6 | 1 |
| 34 | DhEpM (p = 2) | 3755 ± 6 | 1 |
| 38 | OOCp (p = 10) | 3785 ± 3 | 8 |
| 38 | OLaCa (p = 10) | 3785 ± 3 | 8 |
| 38 | OMC (p = 8) | 3796 ± 3 | 8 |
| 36 | EpLnPo (p = 2) | 3799 ± 6 | 1 |
| 36 | DhPHt (p = 2) | 3807 ± 6 | 1 |
| 36 | EpPHt (p = 2) | 3807 ± 6 | 1 |
| 36 | EpStP (p = 2) | 3807 ± 6 | 1 |
| 38 | PLaCa (p = 8) | 3809 ± 3 | 8 |
| 38 | MMCa (p = 6) | 3810 ± 4 | 8 |
| 38 | PoPoCa (p = 2) | 3820 ± 6 | 1 |
| 38 | PPoCo (p = 2) | 3820 ± 6 | 1 |
| 38 | PMC (p = 10) | 3829 ± 3 | 7 |
| 38 | LnLLn (p = 8) | 3830 ± 3 | 3 |
| 36 | EpEpO (p = 2) | 3836 ± 6 | 1 |
| 38 | OPCp (p = 10) | 3842 ± 6 | 8 |
| 38 | PPCp (p = 8) | 3843 ± 4 | 7 |
| 36 | EpEpP (p = 2) | 3850 ± 6 | 1 |
| 36 | DhEpO (p = 2) | 3850 ± 6 | 1 |
| 36 | DhEpP (p = 2) | 3850 ± 6 | 1 |
| 38 | γLnLγLn (p = 2) | 3867 ± 6 | 1 |
| 38 | PoHtM (p = 2) | 3893 ± 6 | 1 |
| 38 | EpPoPo (p = 2) | 3893 ± 6 | 1 |
| 36 | DhDhP (p = 2) | 3893 ± 6 | 1 |
| 38 | PoγLnγLn (p = 2) | 3915 ± 6 | 3 |
| 38 | DhPoPo (p = 2) | 3937 ± 6 | 2 |
| 38 | EpPoM (p = 2) | 3937 ± 6 | 2 |
| 38 | DhMM (p = 2) | 3937 ± 6 | 2 |
| 40 | OMCa (p = 8) | 3987 ± 3 | 10 |
| 38 | EpLnP (p = 2) | 3987 ± 6 | 2 |
| 40 | OOC (p = 8) | 3989 ± 4 | 8 |
| 40 | OPC (p = 10) | 3991 ± 3 | 7 |
| 40 | MMLa (p = 6) | 3992 ± 4 | 7 |
| 40 | OOCo (p = 6) | 3992 ± 4 | 6 |
| 40 | LLLn (p = 10) | 3993 ± 3 | 6 |
| 40 | SOCp (p = 6) | 3993 ± 4 | 6 |
| 40 | LLγLn (p = 6) | 3999 ± 6 | 2 |
| 38 | DhLnP (p = 2) | 4004 ± 6 | 2 |
| 40 | SMC (p = 10) | 4009 ± 3 | 11 |
| 40 | PPC (p = 10) | 4009 ± 3 | 11 |
| 40 | LnLnO (p = 6) | 4011 ± 4 | 5 |
| 40 | SSBu (p = 10) | 4019 ± 4 | 6 |
| 40 | LnPLn (p = 6) | 4023 ± 4 | 5 |
| 38 | DpDhP (p = 2) | 4037 ± 6 | 2 |
| 38 | DhEpS (p = 2) | 4052 ± 6 | 2 |
| 40 | γLnγLnO (p = 2) | 4052 ± 6 | 2 |
| 40 | γLnPγLn (p = 2) | 4064 ± 6 | 2 |
| 40 | LnMM (p = 2) | 4094 ± 6 | 2 |
| 40 | EpOPo (p = 2) | 4094 ± 6 | 2 |
| 40 | EpLP (p = 2) | 4112 ± 6 | 2 |
| 40 | DhOPo (p = 2) | 4135 ± 6 | 2 |
| 40 | DhOM (p = 2) | 4148 ± 6 | 2 |
| 40 | DhPPo (p = 2) | 4148 ± 6 | 2 |
| 42 | LLL (p = 24) | 4160 ± 6 | 10 |
| 42 | OOCa (p = 10) | 4164 ± 2 | 8 |
| 42 | OPCa (p = 8) | 4164 ± 3 | 8 |
| 42 | PoPoPo (p = 2) | 4167 ± 4 | 2 |
| 42 | PoPoM (p = 2) | 4167 ± 6 | 2 |
| 42 | PMLa (p = 2) | 4175 ± 6 | 2 |
| 42 | PPCa (p = 10) | 4176 ± 3 | 9 |
| 42 | SMCa (p = 8) | 4178 ± 4 | 9 |
| 42 | γLnLO (p = 2) | 4181 ± 6 | 2 |
| 42 | LnPPo (p = 2) | 4186 ± 6 | 2 |
| 42 | LPoPo | 4186 ± 6 | 2 |
| 42 | MMM (p = 2) | 4190 ± 6 | 2 |
| 42 | LnLO (p = 8) | 4192 ± 3 | 11 |
| 42 | SPC (p = 10) | 4196 ± 3 | 10 |
| 42 | SSCp (p = 10) | 4196 ± 3 | 10 |
| 42 | OOHt (p = 2) | 4213 ± 4 | 3 |
| 42 | SLnLn (p = 6) | 4216 ± 4 | 4 |
| 42 | LnLP (p = 6) | 4217 ± 6 | 3 |
| 42 | γLnLP (p = 2) | 4221 ± 6 | 2 |
| 42 | SγLnγLn (p = 2) | 4221 ± 6 | 2 |
| 42 | DhPP (p = 2) | 4234 ± 6 | 3 |
| 42 | DhOP (p = 2) | 4246 ± 6 | 3 |
| 42 | EpOO (p = 2) | 4261 ± 6 | 3 |
| 44 | OLPo (p = 2) | 4286 ± 6 | 3 |
| 12 | CE 18:3§ | 4292 ± 6 | 1 |
| 12 | CE 20:4§ | 4292 ± 6 | 1 |
| 44 | OPoM (p = 2) | 4303 ± 6 | 3 |
| 44 | PPoPo (p = 2) | 4338 ± 6 | 3 |
| 44 | LPM (p = 2) | 4338 ± 6 | 3 |
| 44 | GLγLn (p = 2) | 4340 ± 6 | 3 |
| 44 | LLO (p = 50) | 4342 ± 1 | 10 |
| 44 | OLM (p = 10) | 4349 ± 3 | 5 |
| 44 | LLP (p = 24) | 4358 ± 2 | 7 |
| 44 | OOLn (p = 14) | 4360 ± 6 | 11 |
| 44 | PPoM (p = 2) | 4361 ± 2 | 3 |
| 44 | OOγLn (p = 2) | 4364 ± 6 | 3 |
| 44 | OOLa (p = 10) | 4364 ± 3 | 8 |
| 44 | OPoPo (p = 8) | 4367 ± 3 | 11 |
| 44 | SLLn (p = 6) | 4378 ± 6 | 3 |
| 44 | EpSO (p = 2) | 4380 ± 6 | 3 |
| 44 | POLn (p = 4) | 4383 ± 4 | 8 |
| 44 | SPCa (p = 10) | 4386 ± 3 | 9 |
| 44 | PPLa (p = 10) | 4386 ± 3 | 9 |
| 44 | SMLa (p = 10) | 4386 ± 3 | 9 |
| 44 | PMM (p = 10) | 4386 ± 3 | 9 |
| 44 | SOCa (p = 8) | 4387 ± 4 | 9 |
| 44 | POγLn (p = 2) | 4389 ± 6 | 3 |
| 44 | ALnLn (p = 2) | 4395 ± 6 | 3 |
| 44 | PLnP (p = 2) | 4395 ± 6 | 3 |
| 44 | DhSO (p = 2) | 4399 ± 6 | 3 |
| 44 | EpSP (p = 2) | 4416 ± 6 | 3 |
| 14 | CE 18:2§ | 4430 ± 6 | 1 |
| 44 | PγLnP (p = 2) | 4431 ± 6 | 3 |
| 44 | DhSP (p = 2) | 4433 ± 6 | 3 |
| 46 | OOPo (p = 2) | 4485 ± 6 | 3 |

TABLE 2-continued

List of identified compounds, along with their PN, LRI and ΔLRI value

| PN | Compound Name | LRI* | ΔLRI |
|---|---|---|---|
| 46 | C22:1LγLn (p = 2) | 4501 ± 6 | 1 |
| 46 | GLL (p = 2) | 4502 ± 6 | 10 |
| 46 | OOL (p = 42) | 4516 ± 1 | 12 |
| 46 | OOM (p = 10) | 4526 ± 3 | 8 |
| 46 | PLO (p = 46) | 4539 ± 1 | 13 |
| 46 | SLL (p = 8) | 4548 ± 3 | 9 |
| 46 | SOLa (p = 8) | 4551 ± 3 | 15 |
| 46 | PoPP (p = 2) | 4552 ± 6 | 4 |
| 46 | SOLn (p = 6) | 4563 ± 4 | 7 |
| 46 | PLP (p = 24) | 4571 ± 2 | 14 |
| 46 | DhSS (p = 2) | 4577 ± 6 | 4 |
| 46 | SMM (p = 10) | 4580 ± 3 | 15 |
| 46 | PPM (p = 10) | 4580 ± 3 | 15 |
| 46 | SLnP (p = 2) | 4587 ± 6 | 4 |
| 46 | SOγLn (p = 2) | 4599 ± 6 | 4 |
| 46 | SγLnP (p = 2) | 4631 ± 6 | 4 |
| 47 | OOPd (p = 2) | 4690 ± 6 | 4 |
| 47 | OPPd (p = 2) | 4690 ± 6 | 4 |
| 48 | C22:1LL (p = 2) | 4690 ± 6 | 4 |
| 48 | OLG (p = 2) | 4703 ± 6 | 4 |
| 48 | C24:1LγLn (p = 2) | 4723 ± 6 | 9 |
| 48 | OOO (p = 44) | 4729 ± 1 | 14 |
| 16 | CE 18:1[§] | 4734 ± 6 | 1 |
| 48 | GLP (p = 2) | 4740 ± 6 | 4 |
| 48 | SLO (p = 16) | 4746 ± 2 | 8 |
| 48 | SLP (p = 2) | 4750 ± 6 | 4 |
| 48 | SOM (p = 10) | 4754 ± 3 | 13 |
| 48 | POO (p = 44) | 4756 ± 2 | 13 |
| 48 | POP (p = 26) | 4776 ± 2 | 14 |
| 48 | SMP (p = 10) | 4780 ± 3 | 15 |
| 48 | PPP (p = 10) | 4784 ± 3 | 11 |
| 48 | SPPo (p = 2) | 4785 ± 6 | 4 |
| 50 | C24:1LL (p = 2) | 4881 ± 6 | 10 |
| 50 | C22:1LO (p = 2) | 4890 ± 6 | 4 |
| 50 | GOO (p = 2) | 4905 ± 6 | 7 |
| 50 | GOP (p = 2) | 4921 ± 6 | 8 |
| 50 | SLS (p = 2) | 4940 ± 6 | 4 |
| 50 | SOO (p = 34) | 4948 ± 2 | 14 |
| 50 | SOP (p = 28) | 4961 ± 3 | 15 |
| 50 | SPP (p = 12) | 4978 ± 3 | 8 |
| 52 | C22:1γLnC22:1 (p = 2) | 5069 ± 6 | 4 |
| 52 | C24:1OL (p = 2) | 5084 ± 6 | 12 |
| 52 | C22:1OP (p = 2) | 5084 ± 6 | 4 |
| 52 | C22:1OO (p = 2) | 5091 ± 6 | 4 |
| 52 | SOS (p = 20) | 5103 ± 2 | 15 |
| 52 | SSP (p = 10) | 5156 ± 3 | 15 |
| 54 | C22:1OG (p = 2) | 5238 ± 6 | 5 |
| 54 | C22:1OS (p = 2) | 5271 ± 6 | 5 |
| 54 | SSS (p = 2) | 5324 ± 6 | 5 |

*Intersample average;
[#]Monoacylglycerol species;
[$]diacylglycerol species;
[a]extrapolated values;
p: population;
[§]CE = cholesterol esters for which PN coincides with the PN of the fatty acid bound to the cholesterol backbone.

Table 2 also represents the retention indices library (i.e. database) of reference retention indices usable as effective identification tool in liquid chromatography. Said retention index library lists, but is not limited to, a total of 224 compounds identified according to their retention behaviour, obtained by means of the instant method based on the disclosed Retention Index System. In particular, the database can include all simple and complex lipids, such as, for example, free fatty acids, mono-, di- and triacylglycerols, as well as sterols, carotenoids and waxes.

The length of the confidence interval was ≤12 units for all the compounds; as a consequence, a difference between subsequent TAGs (i.e. ΔLRI) higher than 12 LRI units avoids any peak mismatching. As above disclosed, in fact, the identification based only on the Retention Index System of the present invention is reliable in itself and can lead to unequivocal identification (i.e. no retention indices superimposition occurs).

Within this context the chromatographic resolution acquires special importance; it is strongly related to the so-called separation number (SN), which express the number of peaks that can be resolved between two consecutive TAGs of the homologue series (z and z+6, respectively):

$$SN = \frac{t_{R(z+6)} - t_{Rz}}{w_{h(z+6)} + w_{hz}} - 1 \quad \text{Eq. 5}$$

wherein, $t_{R(z+6)}$ and $t_{Rz}$ are the retention times of two consecutive TAGs of the homologue series and $w_{h(z+6)}$ and $w_{hz}$ are the corresponding peak width at half height.

By applying Eq. 5 to the region z=39 and z=45 (arbitrarily chosen, since a great number of TAGs are contained in this region), SN is equal to 25 that means that 25 peaks can be satisfactorily resolved between C13C13C13 and C15C15C15 standard compounds. As a consequence the minimum retention index difference (i.e. δ) between two adjacent peaks must be:

δ=600/(SN+1)

equal in the present situation to 23, which largely overcomes the obtained ΔLRI above described. In order to achieve accurate library search results, the experimental LRI interval length (i.e. ΔLRI*2) must be also minor than δ value (ΔLRI*2<δ). For instance, within the 3900-4500 LRI region, for which δ is equal to 23, ΔLRI should not exceed a value of 11.5 (δ/2, hereinafter also referred as maximum tolerable variability) that means that a larger variation will cause an overlapping between adjacent peaks. Therefore, if two adjacent peaks have a LRI difference equal to or higher than 23 and an index variability lower than ±11.5, no mismatching or misidentification occurs. Accordingly, SN and δ calculations were carried out for all subsequent reference compound peaks, finding that, for each region, δ was equal or even higher than the experimental LRI interval length (δ≥ΔLRI*2). In particular, a total SN of 122 and an average δ of 30 units were obtained, meaning that ΔLRI values minor than 15 normally ensure a reliable identification (δ/2≥ΔLRI), thus demonstrating the high accuracy of the method of the present invention. For evidence, Table 3 is provided here below.

TABLE 3

| Compound | LRI ± ΔLRI | SN between adjacent compounds |
|---|---|---|
| C7C7C7 | 2100 | |
| CaCC | 2691 ± 4* | 12 |
| CaCaCp | 2691 ± 4* | |
| C9C9C9 | 2700 | |
| OCBu | 2816 ± 10 | 21 |
| PCBu | 2816 ± 10 | |
| LaCaCa | 3209 ± 5 | |
| MCaC | 3223 ± 11 | |
| PlaBu | 3241 ± 10 | |
| MlaCp | 3241 ± 10 | |
| PcaCp | 3243 ± 11 | |
| C11C11C11 | 3300 | |
| PcaC | 3414 ± 6 | 29 |
| McaCa | 3416 ± 10 | |
| OLBu | 3441 ± 4 | |
| EpEpEp | 3463 ± 1 | |

TABLE 3-continued

| Compound | LRI ± ΔLRI | SN between adjacent compounds |
|---|---|---|
| DhDhDh | 3500 ± 1 | |
| OlaC | 3597 ± 7 | |
| StStPo | 3600 ± 1 | |
| EpPoHt | 3600 ± 1 | |
| PpoCp | 3604 ± 9 | |
| OOBu | 3620 ± 10 | |
| OMCp | 3622 ± 8 | |
| EpStPo | 3624 ± 1 | |
| EpHtM | 3649 ± 1 | |
| EpStM | 3649 ± 1 | |
| LnLnLn | 3668 ± 5 | |
| EpEpPo | 3669 ± 1 | |
| DhStPo | 3669 ± 1 | |
| DhStM | 3712 ± 1 | |
| EpEpM | 3712 ± 1 | |
| DhEpPo | 3755 ± 1 | |
| DhEpM | 3755 ± 1 | |
| OMC | 3796 ± 8 | |
| EpLnPo | 3799 ± 1 | |
| DhPHt | 3807 ± 1 | |
| EpPHt | 3807 ± 1 | |
| EpStP | 3807 ± 1 | |
| PlaCa | 3809 ± 8 | |
| MMCa | 3810 ± 8 | |
| LnLLn | 3830 ± 3 | |
| EpEpO | 3836 ± 1 | |
| EpEpP | 3850 ± 1 | |
| DhEpP | 3850 ± 1 | |
| EpPoPo | 3893 ± 1 | |
| DhDhP | 3893 ± 1 | |
| C13C13C13 | 3900 | |
| EpPoM | 3937 ± 2 | 25 |
| DhMM | 3937 ± 2 | |
| DhPoPo | 3937 ± 2 | |
| EpLnP | 3987 ± 2 | |
| OOC | 3989 ± 8 | |
| LLLn | 3993 ± 6 | |
| SOCp | 3993 ± 6 | |
| DhLnP | 4004 ± 2 | |
| LnLnO | 4011 ± 4 | |
| LnPLn | 4023 ± 5 | |
| DpDhP | 4037 ± 2 | |
| DhEpS | 4052 ± 2 | |
| LnMM | 4094 ± 2 | |
| EpOPo | 4094 ± 2 | |
| EpLP | 4112 ± 2 | |
| DhOPo | 4135 ± 2 | |
| DhOM | 4148 ± 2 | |
| DhPPo | 4148 ± 2 | |
| LLL | 4160 ± 10 | |
| OOCa | 4164 ± 8 | |
| OPCa | 4164 ± 8 | |
| PoPoM | 4167 ± 2 | |
| PPCa | 4176 ± 9 | |
| SMCa | 4178 ± 9 | |
| LnPPo | 4186 ± 2 | |
| LpoPo | 4186 ± 2 | |
| LnLO | 4192 ± 11 | |
| OOHt | 4213 ± 3 | |
| LnLP | 4216 ± 6 | |
| SLnLn | 4216 ± 3 | |
| DhPP | 4234 ± 3 | |
| DhOP | 4246 ± 3 | |
| EpOO | 4261 ± 3 | |
| OLPo | 4286 ± 3 | |
| OpoM | 4303 ± 3 | |
| PpoPo | 4338 ± 3 | |
| LPM | 4338 ± 3 | |
| LLO | 4342 ± 10 | |
| OLM | 4349 ± 5 | |
| LLP | 4358 ± 7 | |
| OOLn | 4360 ± 11 | |
| PpoM | 4361 ± 3 | |
| OOLa | 4364 ± 8 | |
| OpoPo | 4367 ± 11 | |
| EpSO | 4380 ± 3 | |
| POLn | 4383 ± 8 | |
| PLnP | 4395 ± 3 | |
| DhSO | 4399 ± 3 | |
| EpSP | 4416 ± 3 | |
| DhSP | 4433 ± 3 | |
| OOPo | 4485 ± 3 | |
| C15C15C15 | 4500 | |
| OOL | 4516 ± 12 | 19 |
| OOM | 4526 ± 8 | |
| PLO | 4539 ± 13 | |
| SLL | 4548 ± 9 | |
| PoPP | 4552 ± 4 | |
| SOLn | 4563 ± 7 | |
| PLP | 4571 ± 14 | |
| DhSS | 4577 ± 4 | |
| OOPd | 4690 ± 4 | |
| OPPd | 4690 ± 4 | |
| OOO | 4729 ± 14 | |
| SLO | 4746 ± 8 | |
| SOM | 4754 ± 13 | |
| POO | 4756 ± 13 | |
| POP | 4776 ± 14 | |
| PPP | 4784 ± 11 | |
| SPPo | 4785 ± 4 | |
| SOO | 4948 ± 14 | |
| SOP | 4961 ± 15 | |
| SPP | 4978 ± 8 | |
| C17C17C17 | 5100 | |
| SOS | 5103 ± 15 | 16 |
| SSP | 5156 ± 15 | |
| TOTALE | | 122 |

*Extrapolated values

Figure 6:
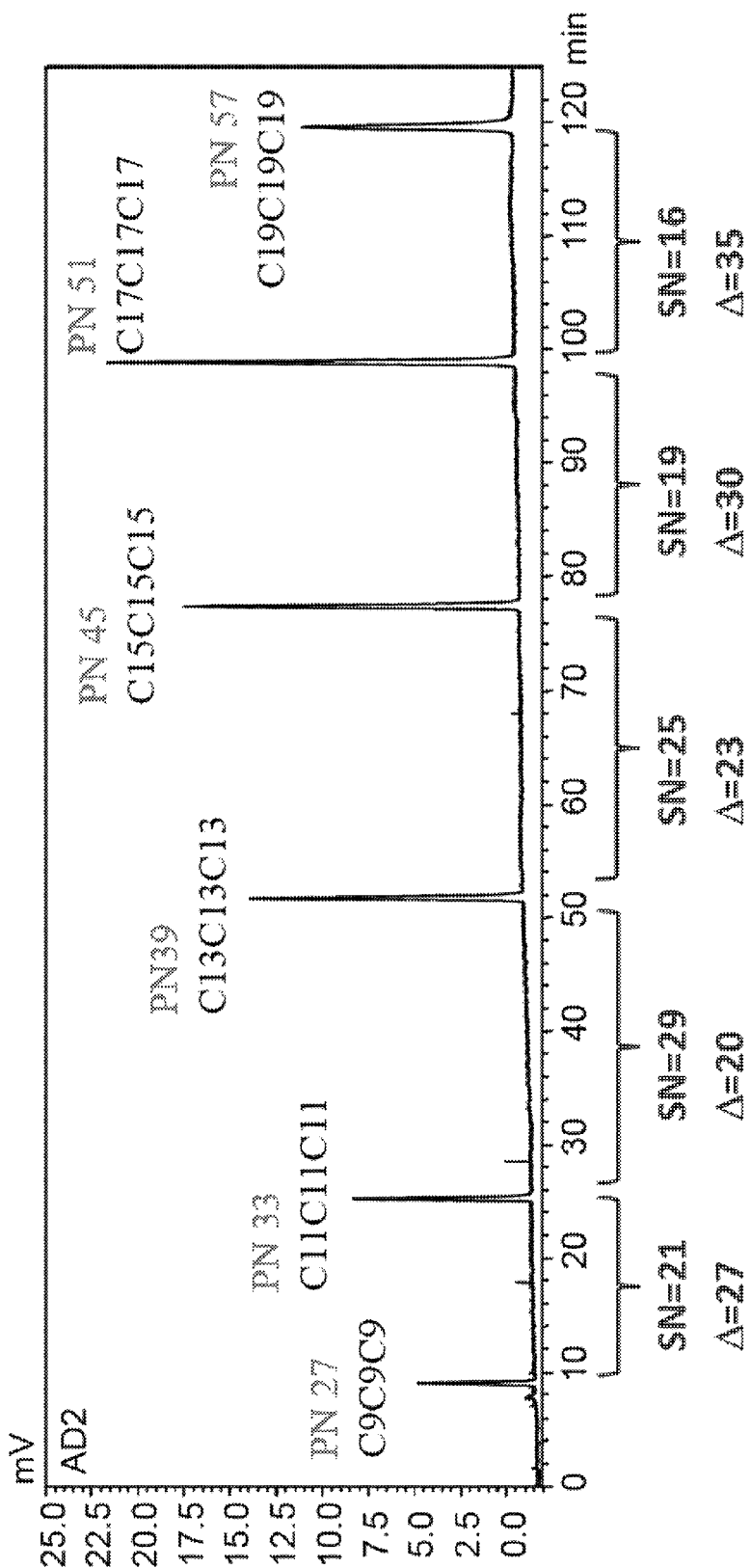
FIG. 6: Chromatogram of the selected homologous series, together with both SN and ΔLRI values (Δ) for each pair of adjacent homologues.

It shows most common identified compounds along with their LRI value, expressed as mean value±experimental variability, and SN value for each pair of adjacent homologues, from which the maximum tolerable variability can be deduced. The experimental variability is lower than the maximum tolerable variability for all the regions of the chromatogram, demonstrating the effectiveness of the instant method. The homologous series chromatogram is shown in FIG. 6 together with both SN and ΔLRI values for each pair of adjacent homologues.

A similar consideration can arise taking into account the average peak width ($w_b$) of the analytes. In fact, being $w_b$=0.8 min (48 s) and 1 LRI=25 min/600=0.042 min (2.52 s), where 25 minutes is the difference time between C13C13C13 and C15C15C15 retention times, a LRI variability (ΔLRI) of ±15 units corresponding to 0.63 min (37.8 s) results minor than $w_b$ (i.e. ΔLRI<$w_b$). In other words, the retention indices obtained have determination repeatability minor than the base peak width of the unknown compounds.

Such a result again proves that each LRI corresponds only to the compound which occupies a specific position in the chromatogram in terms of retention time, pinpointing the reliability of a potential identification based only on the retention index system of the present invention.

The novel Retention Index System of the present invention and the LRI database based thereon has succeed in the identification of a multitude of different real world lipid samples such as, but not limited to, the following: vegetal oils, aquatic organisms (e.g. fish and algae) and derivatives thereof (e.g. fishmeal and fish oils), dairy products and biological samples as whole blood, plasma and cell membranes.

DESCRIPTION OF PREFERRED EMBODIMENTS

The embodiments herein described have illustrative purpose only and are not meant to limit the scope of the claimed invention. Moreover, modifications and alterations of the embodiments below, obvious to a man skilled in the art, are intended to be encompassed by the attached claims.

Samples Preparation

For the purpose of the present invention, any lipid sample is a suitable sample. In particular, vegetable oils, fish oils, milk fats, milk-derived fats, derivatives and combinations thereof are all suitable samples. In some embodiments, vegetable oils (e.g., peanut, corn, soybean, rapeseed, grapeseed, almond, hazelnut, sunflower, linseed, chia, sacha inchi, borage, castor, olive), fish oils (e.g., menhaden, cod liver, sea bream, tuna fish, fish integrator, shrimps) and milk and milk derived fats (e.g., goat, cow, whole biological milk, buffalo mozzarella, butter) were selected. Lipid samples preparation was performed according to any of the suitable methods known in the art for the extraction of the lipid phase (e.g., lipid extraction using organic solvents or by the Folch and Bligh&Dyer procedures, for milk and fish samples respectively). Usually, the injection is performed at a concentration of 1-10 mg/ml.

LRI Calculation and Data Analysis

LRI were calculated according to Eq. 4, by using the odd-chain TAGs as reference homologous series according to the present invention (e.g., from C9C9C9 to C19C19C19) and by assigning to z a value equal to the partition number (PN) of each reference TAG that is related to the carbon chain length (CN) and double bond number (DB) accordingly to the following equation:

$$PN = CN - 2DB$$

Therefore z is 27 for C9C9C9, up to 57 for C19C19C19, and n is equal to 6.

The LRI database was built by using the CromatoplusSpectra software (Chromaleont, Messina, Italy), that was also able to extrapolate LRI values for compounds eluted earlier than C9C9C9 and subsequent to C19C19C19. Then analyses were processed by using the CromatoplusSpectra software, which allowed to directly match the LRI automatically calculated for each peak with those of the LRI database previously created.

Evidence of the Method Independency: Repeatability Studies

The inventors of the present invention have successfully established a novel Retention Index System such that the chromatographic method based thereon is able not only to provide maximum resolution for a wide range of lipid samples but it is also independent from the selected chromatographic conditions and, as a consequence, repeatable both at intra- and inter-laboratory level.

As regards the method repeatability, the inventors of the present invention have also performed a systematic study in order to assess the LRI stability under a wide range of experimental conditions. In particular, all the analytical parameters playing a role in the chromatographic separation such as, for example, column dimension, stationary phase packing, flow rate, oven temperature, gradient and mobile phase composition were accurately evaluated by injecting three vegetable oils (borage, linseed and olive oils) comprising a total of 54 TAGs. This repeatability study is not limited to the selected oils, but rather is representative for all the lipid samples for which the present chromatographic method is suitable.

Regarding the columns, two different stationary phase packing were compared: monodisperse sub-2 μm (particle size 1.9 μm) and partially porous (particle size 2.7 and 2.0 μm) particles. In addition, different column dimensions were used: 100×2.1 mm, L×ID, operated at 400 μL/min and 100×4.6 mm, L×ID, operated at 1.8 mL/min in order to evaluate the internal diameter effect. The stationary phase bed length was also changed by considering two serially coupled columns. The results are reported in Table 4 below, which contains the list of TAGs along with their PN and LRI value on each column. The inter-sample average and ΔLRI are also provided. The experiment shows that the method of the present invention is independent from both column dimensions and stationary phase packing since a variability (ΔLRI)≤15 was obtained.

TABLE 4

| | | LRI | |
|---|---|---|---|
| | | 2 Titan 100 mm × 2.1 mm ID, 1.9 μm dp (monodisperse)[a] | 1 Titan 100 mm × 2.1 mm ID, 1.9 μm dp (monodisperse)[b] |
| PN | Compound Name | | |
| 36 | LnLnLn | 3668 | 3673 |
| 36 | γLnγLnγLn | 3747 | 3738 |
| 38 | LnLLn | 3830 | 3840 |
| 38 | γLnLγLn | 3867 | 3886 |
| 38 | PoγLnγLn | 3915 | 3914 |
| 40 | LLLn | 3993 | 4002 |
| 40 | LLγLn | 3999 | 4022 |
| 40 | LnLnO | 4011 | 4012 |
| 40 | LnPLn | 4023 | — |
| 40 | γLnγLnO | 4052 | 4071 |
| 40 | γLnPγLn | 4086 | 4084 |
| 42 | LLL | 4160 | 4165 |
| 42 | γLnLO | 4181 | 4204 |
| 42 | LnLO | 4192 | 4188 |
| 42 | SLnLn | 4216 | 4206 |
| 42 | LnLP | 4217 | 4227 |
| 42 | γLnLP | 4221 | 4223 |
| 42 | SγLnγLn | 4221 | 4223 |
| 44 | LLO | 4342 | 4348 |
| 44 | LLP | 4358 | 4364 |
| 44 | OOLn | 4360 | 4367 |
| 44 | OOγLn | 4364 | 4382 |
| 44 | POLn | 4383 | 4387 |
| 44 | POγLn | 4389 | 4408 |
| 44 | PγLnP | 4431 | 4428 |
| 46 | GLL | 4502 | 4511 |
| 46 | OOL | 4516 | 4525 |
| 46 | PLO | 4539 | 4551 |
| 46 | SLL | 4548 | — |
| 46 | SOLn | 4563 | 4574 |
| 46 | PLP | 4571 | 4574 |
| 46 | SOγLn | 4599 | 4588 |
| 46 | SγLnP | 4631 | 4625 |
| 48 | C22:1LL | 4690 | 4701 |
| 48 | OLG | 4703 | 4711 |
| 48 | C24:1LγLn | 4723 | 4732 |
| 48 | OOO | 4729 | 4734 |
| 48 | GLP | 4740 | — |
| 48 | POO | 4756 | 4762 |
| 48 | POP | 4776 | 4781 |
| 50 | C24:1LL | 4881 | 4880 |
| 50 | C22:1LO | 4890 | 4893 |
| 50 | GOO | 4905 | 4908 |
| 50 | GOP | 4921 | 4923 |

TABLE 4-continued

| PN | Compound Name | | |
|---|---|---|---|
| 50 | SLS | 4940 | — |
| 50 | SOO | 4948 | 4949 |
| 50 | SOP | 4961 | — |
| 50 | SPP | 4978 | — |
| 52 | C22:1γLnC22:1 | 5069 | 5065 |
| 52 | C24:1OL | 5084 | 5081 |
| 52 | C22:1OO | 5091 | 5095 |
| 52 | SOS | 5103 | 5103 |
| 54 | C22:1OG | 5238 | 5251 |
| 54 | C22:1OS | 5271 | 5282 |

| | | LRI | |
|---|---|---|---|
| PN | Compound Name | 1 Ascentis Express 100 mm × 2.1 mm ID, 2.7 μm dp (partially porous)[b] | 1 Ascentis Express 100 mm × 4.6 mm ID, 2.7 μm dp (partially porous)[c] |
| 36 | LnLnLn | 3667 | 3669 |
| 36 | γLnγLnγLn | 3740 | 3732 |
| 38 | LnLLn | 3842 | 3842 |
| 38 | γLnLγLn | 3893 | 3889 |
| 38 | PoγLnγLn | 3917 | — |
| 40 | LLLn | 4006 | 4005 |
| 40 | LLγLn | 4022 | 4022 |
| 40 | LnLnO | 4019 | 4015 |
| 40 | LnPLn | 4042 | 4040 |
| 40 | γLnγLnO | 4078 | 4072 |
| 40 | γLnPγLn | 4094 | 4088 |
| 42 | LLL | 4170 | 4160 |
| 42 | γLnLO | 4205 | 4201 |
| 42 | LnLO | 4193 | 4186 |
| 42 | SLnLn | 4212 | — |
| 42 | LnLP | 4236 | 4229 |
| 42 | γLnLP | 4226 | 4221 |
| 42 | SγLnγLn | 4226 | 4221 |
| 44 | LLO | 4348 | 4339 |
| 44 | LLP | 4365 | 4360 |
| 44 | OOLn | 4370 | 4365 |
| 44 | OOγLn | 4386 | 4379 |
| 44 | POLn | 4393 | 4389 |
| 44 | POγLn | 4413 | 4407 |
| 44 | PγLnP | 4435 | 4431 |
| 46 | GLL | 4517 | 4511 |
| 46 | OOL | 4531 | 4522 |
| 46 | PLO | 4557 | 4548 |
| 46 | SLL | 4575 | 4575 |
| 46 | SOLn | 4588 | — |
| 46 | PLP | 4594 | 4584 |
| 46 | SOγLn | 4610 | 4602 |
| 46 | SγLnP | 4638 | 4629 |
| 48 | C22:1LL | 4706 | 4699 |
| 48 | OLG | 4711 | 4710 |
| 48 | C24:1LγLn | 4717 | 4723 |
| 48 | OOO | 4740 | 4732 |
| 48 | GLP | 4732 | 4740 |
| 48 | POO | 4769 | 4763 |
| 48 | POP | 4787 | 4779 |
| 50 | C24:1LL | 4891 | 4882 |
| 50 | C22:1LO | 4896 | 4891 |
| 50 | GOO | 4910 | 4904 |
| 50 | GOP | 4930 | 4919 |
| 50 | SLS | — | — |
| 50 | SOO | 4947 | 4938 |
| 50 | SOP | 4945 | 4943 |
| 50 | SPP | 4978 | 4972 |
| 52 | C22:1γLnC22:1 | 5071 | — |
| 52 | C24:1OL | 5080 | 5078 |
| 52 | C22:1OO | 5097 | 5088 |
| 52 | SOS | 5106 | 5106 |
| 54 | C22:1OG | 5243 | 5228 |
| 54 | C22:1OS | 5271 | 5267 |

| | | LRI | |
|---|---|---|---|
| PN | Compound Name | 1 Ascentis Express 100 mm × 2.1 mm ID, 2 μm dp (partially porous)[b] | TOTAL AVERAGE |
| 36 | LnLnLn | 3654 | 3665 |
| 36 | γLnγLnγLn | 3733 | 3738 |
| 38 | LnLLn | 3823 | 3835 |
| 38 | γLnLγLn | 3874 | 3882 |
| 38 | PoγLnγLn | 3913 | 3915 |
| 40 | LLLn | 3989 | 3999 |
| 40 | LLγLn | 4009 | 4015 |
| 40 | LnLnO | 4002 | 4012 |
| 40 | LnPLn | 4031 | 4034 |
| 40 | γLnγLnO | 4063 | 4067 |
| 40 | γLnPγLn | 4081 | 4086 |
| 42 | LLL | 4151 | 4161 |
| 42 | γLnLO | 4189 | 4196 |
| 42 | LnLO | 4175 | 4187 |
| 42 | SLnLn | 4198 | 4208 |
| 42 | LnLP | 4223 | 4226 |
| 42 | γLnLP | 4215 | 4221 |
| 42 | SγLnγLn | 4215 | 4221 |
| 44 | LLO | 4331 | 4341 |
| 44 | LLP | 4352 | 4360 |
| 44 | OOLn | 4356 | 4364 |
| 44 | OOγLn | 4367 | 4375 |
| 44 | POLn | 4382 | 4387 |
| 44 | POγLn | 4402 | 4403 |
| 44 | PγLnP | 4430 | 4431 |
| 46 | GLL | 4498 | 4508 |
| 46 | OOL | 4515 | 4522 |
| 46 | PLO | 4546 | 4548 |
| 46 | SLL | 4550 | 4562 |
| 46 | SOLn | 4577 | 4575 |
| 46 | PLP | 4579 | 4580 |
| 46 | SOγLn | 4598 | 4599 |
| 46 | SγLnP | 4634 | 4631 |
| 48 | C22:1LL | 4692 | 4698 |
| 48 | OLG | 4703 | 4708 |
| 48 | C24:1LγLn | 4719 | 4723 |
| 48 | OOO | 4727 | 4732 |
| 48 | GLP | 4735 | 4737 |
| 48 | POO | 4761 | 4762 |
| 48 | POP | 4783 | 4781 |
| 50 | C24:1LL | 4873 | 4881 |
| 50 | C22:1LO | 4883 | 4890 |
| 50 | GOO | 4898 | 4905 |
| 50 | GOP | 4914 | 4921 |
| 50 | SLS | 4940 | 4940 |
| 50 | SOO | 4938 | 4944 |
| 50 | SOP | 4951 | 4950 |
| 50 | SPP | 4975 | 4976 |
| 52 | C22:1γLnC22:1 | 5052 | 5064 |
| 52 | C24:1OL | 5065 | 5077 |
| 52 | C22:1OO | 5085 | 5091 |
| 52 | SOS | 5099 | 5103 |
| 54 | C22:1OG | 5230 | 5238 |
| 54 | C22:1OS | 5265 | 5271 |

| PN | Compound Name | ΔLRI |
|---|---|---|
| 36 | LnLnLn | 11 |
| 36 | γLnγLnγLn | 9 |
| 38 | LnLLn | 13 |
| 38 | γLnLγLn | 14 |
| 38 | PoγLnγLn | 3 |
| 40 | LLLn | 10 |
| 40 | LLγLn | 15 |
| 40 | LnLnO | 10 |
| 40 | LnPLn | 11 |
| 40 | γLnγLnO | 15 |
| 40 | γLnPγLn | 7 |
| 42 | LLL | 10 |
| 42 | γLnLO | 14 |
| 42 | LnLO | 11 |
| 42 | SLnLn | 10 |
| 42 | LnLP | 10 |

TABLE 4-continued

| | | |
|---|---|---|
| 42 | γLnLP | 6 |
| 42 | SγLnγLn | 6 |
| 44 | LLO | 10 |
| 44 | LLP | 8 |
| 44 | OOLn | 8 |
| 44 | OOγLn | 12 |
| 44 | POLn | 6 |
| 44 | POγLn | 15 |
| 44 | PγLnP | 4 |
| 46 | GLL | 10 |
| 46 | OOL | 9 |
| 46 | PLO | 9 |
| 46 | SLL | 14 |
| 46 | SOLn | 13 |
| 46 | PLP | 14 |
| 46 | SOγLn | 11 |
| 46 | SγLnP | 6 |
| 48 | C22:1LL | 8 |
| 48 | OLG | 5 |
| 48 | C24:1LγLn | 9 |
| 48 | OOO | 7 |
| 48 | GLP | 5 |
| 48 | POO | 7 |
| 48 | POP | 6 |
| 50 | C24:1LL | 10 |
| 50 | C22:1LO | 8 |
| 50 | GOO | 7 |
| 50 | GOP | 8 |
| 50 | SLS | 0 |
| 50 | SOO | 6 |
| 50 | SOP | 11 |
| 50 | SPP | 4 |
| 52 | C22:1γLnC22:1 | 12 |
| 52 | C24:1OL | 12 |
| 52 | C22:1OO | 7 |
| 52 | SOS | 4 |
| 54 | C22:1OG | 13 |
| 54 | C22:1OS | 11 |

<sup>a</sup>flow rate 400 μL/min, gradient: 0-105 min, 0-50% B (hold 20 min);
<sup>b</sup>flow rate 400 μL/min, gradient: 0-52.5 min, 0-50% B (hold 10 min);
<sup>c</sup>flow rate 1.8 mL/min, gradient: 0-52.5 min, 0-50% B (hold 10 min).
Oven temperature was 35° C. in all the analyses.

It is worth noting also that, despite previous works taught the use of wider-bore columns (namely 4.6 mm I.D or greater), the method of the present invention using narrow-bore columns (2.1 mm I.D) and operating at a smaller flow rate allows a more straightforward coupling with MS detectors, if any, in addition to a significant solvent saving.

The partially porous 100×2.1 mm, L×ID, 2.0 μm $d_p$, column was then selected for the evaluation of the effect of the other parameters.

Three different flow rates were then compared: 300 μL/min, 400 μL/min, and 500 μL/min in gradient mode (i.e. 0-52.5 min, 0-50% B (hold 10 min)) at 35° C. The below Table 5 shows the LRI values calculated at different flow rates along with their average ΔRLI, highlighting a perfect agreement between all the conditions (ΔLRI≤10) and leading to conclude that the method of the present invention is independent even from the flow rate.

TABLE 5

| | | LRI | | | |
|---|---|---|---|---|---|
| Compound PN Name | 300 μL/min | 400 μL/min | 500 μL/min | TOTAL AVERAGE | ΔLRI |
| 36 LnLnLn | 3651 | 3647 | 3643 | 3647 | 4 |
| 36 γLnγLnγLn | 3733 | 3733 | 3732 | 3732 | 1 |
| 38 LnLLn | 3820 | 3823 | 3826 | 3823 | 3 |
| 38 γLnLγLn | 3869 | 3874 | 3880 | 3874 | 6 |
| 38 PoγLnγLn | 3901 | 3913 | 3918 | 3910 | 10 |
| 40 LLLn | 3982 | 3989 | 3995 | 3989 | 7 |

TABLE 5-continued

| | | LRI | | | |
|---|---|---|---|---|---|
| Compound PN Name | 300 μL/min | 400 μL/min | 500 μL/min | TOTAL AVERAGE | ΔLRI |
| 40 LnLnO | 3994 | 4002 | 4007 | 4001 | 7 |
| 40 LLγLn | 4003 | 4009 | 4013 | 4008 | 5 |
| 40 LnPLn | 4025 | 4031 | 4036 | 4030 | 6 |
| 40 γLnγLnO | 4054 | 4063 | 4067 | 4061 | 7 |
| 40 γLnPγLn | 4075 | 4081 | 4084 | 4080 | 5 |
| 42 LLL | 4144 | 4151 | 4157 | 4150 | 7 |
| 42 LnLO | 4167 | 4175 | 4181 | 4175 | 8 |
| 42 γLnLO | 4182 | 4189 | 4193 | 4188 | 6 |
| 42 SLnLn | 4190 | 4198 | 4203 | 4197 | 7 |
| 42 γLnLP | 4208 | 4215 | 4217 | 4213 | 5 |
| 42 SγLnγLn | 4208 | 4215 | 4217 | 4213 | 5 |
| 42 LnLP | 4215 | 4223 | 4229 | 4222 | 7 |
| 44 LLO | 4323 | 4331 | 4337 | 4330 | 7 |
| 44 LLP | 4345 | 4352 | 4357 | 4351 | 7 |
| 44 OOLn | 4348 | 4356 | 4362 | 4355 | 8 |
| 44 OOγLn | 4357 | 4367 | 4373 | 4366 | 9 |
| 44 POLn | 4375 | 4382 | 4388 | 4382 | 7 |
| 44 POγLn | 4393 | 4402 | 4406 | 4400 | 7 |
| 44 PγLnP | 4424 | 4430 | 4434 | 4429 | 5 |
| 46 GLL | 4492 | 4498 | 4505 | 4498 | 6 |
| 46 OOL | 4510 | 4515 | 4521 | 4515 | 6 |
| 46 PLO | 4541 | 4546 | 4549 | 4545 | 5 |
| 46 SLL | 4546 | 4550 | — | 4548 | 2 |
| 46 SOLn | 4571 | 4577 | 4580 | 4576 | 5 |
| 46 PLP | 4577 | 4579 | 4585 | 4580 | 5 |
| 46 SOγLn | 4591 | 4598 | 4603 | 4597 | 6 |
| 46 SγLnP | 4625 | 4634 | 4634 | 4631 | 6 |
| 48 C22:1LL | 4682 | 4692 | 4695 | 4690 | 8 |
| 48 OLG | 4695 | 4703 | 4706 | 4701 | 7 |
| 48 C24:1LγLn | 4713 | 4719 | 4721 | 4718 | 5 |
| 48 OOO | 4720 | 4727 | 4729 | 4726 | 6 |
| 48 GLP | 4725 | 4735 | 4738 | 4733 | 8 |
| 48 POO | 4755 | 4761 | 4762 | 4759 | 4 |
| 48 POP | 4778 | 4783 | 4784 | 4781 | 4 |
| 50 C24:1LL | 4864 | 4873 | 4877 | 4871 | 7 |
| 50 C22:1LO | 4874 | 4883 | 4885 | 4880 | 7 |
| 50 GOO | 4890 | 4898 | 4899 | 4895 | 6 |
| 50 GOP | 4909 | 4914 | 4917 | 4913 | 5 |
| 50 SOO | 4933 | 4938 | 4938 | 4936 | 4 |
| 50 SLS | 4936 | 4940 | 4941 | 4939 | 3 |
| 50 SOP | 4944 | 4951 | 4954 | 4949 | 6 |
| 50 SPP | 4968 | 4975 | 4973 | 4972 | 4 |
| 52 C22:1γLnC22:1 | 5044 | 5052 | 5053 | 5050 | 6 |
| 52 C24:1OL | 5054 | 5065 | 5068 | 5062 | 8 |
| 52 C22:1OO | 5079 | 5085 | 5085 | 5083 | 4 |
| 52 SOS | 5099 | 5099 | 5097 | 5098 | 1 |
| 54 C22:1OG | 5222 | 5230 | 5229 | 5227 | 5 |
| 54 C22:1OS | 5257 | 5265 | 5264 | 5262 | 5 |

Regarding the gradient of the elution phase, three different gradient steepness (% B/min) were compared, namely, 0.95% B/min, 1.4% B/min, and 0.70% B/min. Table 6 below shows the LRI values calculated at different gradient steepness along with their average ΔRLI demonstrating again that the method is not significantly affected by this change (ΔLRI≤15).

TABLE 6

| | | LRI | | | |
|---|---|---|---|---|---|
| Compound PN Name | 0.95% B/min | 1.4% B/min | 0.70% B/min | TOTAL AVERAGE | ΔLRI |
| 36 LnLnLn | 3647 | 3647 | 3653 | 3649 | 4 |
| 36 γLnγLnγLn | 3733 | 3730 | 3737 | 3733 | 4 |
| 38 LnLLn | 3823 | 3815 | 3836 | 3825 | 12 |
| 38 γLnLγLn | 3874 | 3865 | 3891 | 3877 | 15 |
| 38 PoγLnγLn | 3913 | 3899 | — | 3906 | 7 |
| 40 LLLn | 3989 | 3978 | 4002 | 3989 | 12 |
| 40 LnLnO | 4002 | 3991 | 4012 | 4002 | 11 |
| 40 LLγLn | 4009 | 3998 | 4020 | 4009 | 11 |

TABLE 6-continued

| PN | Compound Name | 0.95% B/min | 1.4% B/min | 0.70% B/min | TOTAL AVERAGE | ΔLRI |
|---|---|---|---|---|---|---|
| 40 | LnPLn | 4031 | 4021 | 4040 | 4030 | 10 |
| 40 | γLnγLnO | 4063 | 4051 | 4073 | 4062 | 11 |
| 40 | γLnPγLn | 4081 | 4071 | 4091 | 4081 | 10 |
| 42 | LLL | 4151 | 4139 | 4159 | 4150 | 11 |
| 42 | LnLO | 4175 | 4163 | 4185 | 4174 | 12 |
| 42 | γLnLO | 4189 | 4177 | 4198 | 4188 | 11 |
| 42 | SLnLn | 4198 | 4186 | 4207 | 4197 | 11 |
| 42 | γLnLP | 4215 | 4204 | 4223 | 4214 | 10 |
| 42 | SγLnγLn | 4215 | 4204 | 4223 | 4214 | 10 |
| 42 | LnLP | 4223 | 4210 | 4234 | 4222 | 12 |
| 44 | LLO | 4331 | 4317 | 4342 | 4330 | 13 |
| 44 | OOLn | 4356 | 4343 | 4367 | 4355 | 13 |
| 44 | LLP | 4352 | 4340 | 4362 | 4351 | 12 |
| 44 | OOγLn | 4367 | 4353 | 4379 | 4366 | 13 |
| 44 | POLn | 4382 | 4369 | 4394 | 4381 | 13 |
| 44 | POγLn | 4402 | 4389 | 4411 | 4400 | 12 |
| 44 | PγLnP | 4430 | 4422 | 4435 | 4429 | 7 |
| 46 | GLL | 4498 | 4486 | 4512 | 4499 | 13 |
| 46 | OOL | 4515 | 4504 | 4527 | 4515 | 12 |
| 46 | PLO | 4546 | 4535 | 4554 | 4545 | 10 |
| 46 | SLL | 4550 | 4569 | 4579 | 4566 | 16 |
| 46 | SOLn | 4577 | 4564 | 4583 | 4575 | 11 |
| 46 | PLP | 4579 | 4576 | 4598 | 4584 | 14 |
| 46 | SOγLn | 4598 | 4618 | 4604 | 4607 | 11 |
| 46 | SγLnP | 4634 | — | 4636 | 4635 | 1 |
| 48 | C22:1LL | 4692 | 4687 | 4700 | 4693 | 7 |
| 48 | OLG | 4703 | 4711 | 4710 | 4708 | 5 |
| 48 | C24:1LγLn | 4719 | 4720 | 4726 | 4722 | 4 |
| 48 | OOO | 4727 | 4727 | 4733 | 4729 | 4 |
| 48 | GLP | 4735 | 4735 | 4744 | 4738 | 6 |
| 48 | POO | 4761 | 4779 | 4766 | 4769 | 11 |
| 48 | POP | 4783 | 4776 | — | 4779 | 4 |
| 50 | C24:1LL | 4873 | 4866 | — | 4869 | 4 |
| 50 | C22:1LO | 4883 | 4885 | — | 4884 | 1 |
| 50 | GOO | 4898 | 4903 | — | 4900 | 3 |
| 50 | GOP | 4914 | 4916 | — | 4915 | 1 |
| 50 | SOO | 4938 | 4932 | 4947 | 4939 | 8 |
| 50 | SLS | 4940 | 4944 | — | 4942 | 2 |
| 50 | SOP | 4951 | 4966 | — | 4959 | 8 |
| 50 | SPP | 4975 | — | — | 4975 | 0 |
| 52 | C22:1γLnC22:1 | 5052 | 5054 | — | 5053 | 1 |
| 52 | C24:1OL | 5065 | 5074 | — | 5069 | 4 |
| 52 | C22:1OO | 5085 | 5087 | — | 5086 | 1 |
| 52 | SOS | 5099 | — | — | 5099 | 0 |
| 54 | C22:1OG | 5230 | — | — | 5230 | 0 |
| 54 | C22:1OS | 5265 | — | — | 5265 | 0 |

Regarding the temperature, three different oven temperature were compared in the range 30-40° C., namely, 30° C., 35° C. and 40° C., leading to the conclusion that a variation of 10° C. can affect the LRI value, while 5° C. difference could not have a strong influence on the chromatographic method. Table 7 below shows both the average between 30 and 35° C. and between 35 and 40° C., along with their ΔLRI values, showing once again that the method of the present invention is reliable and repeatable even in case of a differential temperature (i.e. up to 5° C.) with a maximum ΔLRI equal to 13.

TABLE 7

| PN | Compound Name | LRI 30° C. | LRI 35° C. | LRI 40° C. |
|---|---|---|---|---|
| 36 | LnLnLn | 3651 | 3647 | 3651 |
| 36 | γLnγLnγLn | 3755 | 3733 | 3724 |
| 38 | LnLLn | 3819 | 3823 | 3835 |
| 38 | γLnLγLn | 3866 | 3874 | 3891 |
| 38 | PoγLnγLn | 3897 | 3913 | 3927 |
| 40 | LLLn | 3982 | 3989 | 4001 |
| 40 | LnLnO | 3993 | 4002 | 4013 |
| 40 | LLγLn | 3998 | 4009 | 4020 |
| 40 | LnPLn | 4028 | 4031 | 4035 |
| 40 | γLnγLnO | 4053 | 4063 | 4073 |
| 40 | γLnPγLn | 4075 | 4081 | 4088 |
| 42 | LLL | 4140 | 4151 | 4162 |
| 42 | LnLO | 4165 | 4175 | 4186 |
| 42 | γLnLO | 4178 | 4189 | 4198 |
| 42 | SLnLn | 4192 | 4198 | 4205 |
| 42 | γLnLP | 4206 | 4215 | 4220 |
| 42 | SγLnγLn | 4206 | 4215 | 4220 |
| 42 | LnLP | 4216 | 4223 | 4231 |
| 44 | LLO | 4320 | 4331 | 4342 |
| 44 | OOLn | 4349 | 4356 | 4366 |
| 44 | LLP | 4346 | 4352 | 4360 |
| 44 | OOγLn | 4365 | 4367 | 4382 |
| 44 | POLn | 4378 | 4382 | 4391 |
| 44 | POγLn | 4395 | 4402 | 4410 |
| 44 | PγLnP | 4429 | 4430 | 4432 |
| 46 | GLL | 4485 | 4498 | 4516 |
| 46 | OOL | 4502 | 4515 | 4528 |
| 46 | PLO | 4535 | 4546 | 4554 |
| 46 | SLL | 4550 | 4550 | 4575 |
| 46 | SOLn | 4563 | 4577 | 4584 |
| 46 | PLP | 4573 | 4579 | 4588 |
| 46 | SOγLn | 4586 | 4598 | 4607 |
| 46 | SγLnP | 4624 | 4634 | 4633 |
| 48 | C22:1LL | 4670 | 4692 | 4700 |
| 48 | OLG | 4684 | 4703 | 4707 |
| 48 | C24:1LγLn | 4704 | 4719 | 4722 |
| 48 | OOO | 4712 | 4727 | 4730 |
| 48 | GLP | 4717 | 4735 | 4739 |
| 48 | POO | 4749 | 4761 | 4760 |
| 48 | POP | 4774 | 4783 | 4779 |
| 50 | C24:1LL | 4849 | 4873 | 4889 |
| 50 | C22:1LO | 4860 | 4883 | 4893 |
| 50 | GOO | 4878 | 4898 | 4907 |
| 50 | GOP | 4897 | 4914 | 4923 |
| 50 | SLS | 4915 | 4940 | 4945 |
| 50 | SOO | 4913 | 4938 | 4944 |
| 50 | SOP | 4927 | 4951 | 4972 |
| 50 | SPP | 4968 | 4975 | 4973 |
| 52 | C22:1γLnC22:1 | 5034 | 5052 | 5067 |
| 52 | C24:1OL | 5049 | 5065 | 5077 |
| 52 | C22:1OO | 5069 | 5085 | 5095 |
| 52 | SOS | 5086 | 5099 | 5103 |
| 54 | C22:1OG | 5212 | 5230 | 5239 |
| 54 | C22:1OS | 5248 | 5265 | 5269 |

| PN | Compound Name | ΔLRI | AVERAGE (35° C./40° C.) | ΔLRI (35° C./40° C.) |
|---|---|---|---|---|
| 36 | LnLnLn | 11 | 3649 | 2 |
| 36 | γLnγLnγLn | 27 | 3728 | 5 |
| 38 | LnLLn | 29 | 3829 | 6 |
| 38 | γLnLγLn | 31 | 3882 | 9 |
| 38 | PoγLnγLn | 27 | 3920 | 7 |
| 40 | LLLn | 23 | 3995 | 6 |
| 40 | LnLnO | 22 | 4007 | 5 |
| 40 | LLγLn | 24 | 4014 | 6 |
| 40 | LnPLn | 4 | 4033 | 2 |
| 40 | γLnγLnO | 22 | 4068 | 5 |
| 40 | γLnPγLn | 14 | 4084 | 3 |
| 42 | LLL | 21 | 4156 | 5 |
| 42 | LnLO | 22 | 4180 | 5 |
| 42 | γLnLO | 22 | 4193 | 5 |
| 42 | SLnLn | 11 | 4201 | 4 |
| 42 | γLnLP | 11 | 4217 | 2 |
| 42 | SγLnγLn | 11 | 4217 | 2 |
| 42 | LnLP | 17 | 4227 | 4 |
| 44 | LLO | 26 | 4337 | 5 |
| 44 | OOLn | 22 | 4361 | 5 |
| 44 | LLP | 18 | 4356 | 4 |
| 44 | OOγLn | 29 | 4374 | 7 |
| 44 | POLn | 16 | 4386 | 4 |
| 44 | POγLn | 21 | 4406 | 4 |
| 44 | PγLnP | 2 | 4431 | 1 |
| 46 | GLL | 16 | 4507 | 9 |
| 46 | OOL | 34 | 4521 | 7 |

TABLE 7-continued

| PN | Compound Name | | | |
|----|---|---|---|---|
| 46 | PLO | 25 | 4550 | 4 |
| 46 | SLL | 13 | 4562 | 13 |
| 46 | SOLn | 28 | 4580 | 3 |
| 46 | PLP | 12 | 4583 | 4 |
| 46 | SOγLn | 11 | 4602 | 4 |
| 46 | SγLnP | 17 | 4633 | 1 |
| 48 | C22:1LL | 40 | 4696 | 4 |
| 48 | OLG | 34 | 4705 | 2 |
| 48 | C24:1LγLn | 11 | 4720 | 1 |
| 48 | OOO | 25 | 4728 | 1 |
| 48 | GLP | 26 | 4737 | 2 |
| 48 | POO | 15 | 4760 | 0 |
| 48 | POP | 6 | 4781 | 2 |
| 50 | C24:1LL | 39 | 4881 | 8 |
| 50 | C22:1LO | 278 | 4888 | 5 |
| 50 | GOO | 16 | 4902 | 5 |
| 50 | GOP | 28 | 4919 | 5 |
| 50 | SLS | 18 | 4942 | 3 |
| 50 | SOO | 27 | 4941 | 3 |
| 50 | SOP | 32 | 4962 | 11 |
| 50 | SPP | 4 | 4974 | 1 |
| 52 | C22:1γLnC22:1 | 40 | 5060 | 8 |
| 52 | C24:1OL | 42 | 5071 | 6 |
| 52 | C22:1OO | 31 | 5090 | 5 |
| 52 | SOS | 28 | 5101 | 2 |
| 54 | C22:1OG | 32 | 5234 | 5 |
| 54 | C22:1OS | 16 | 5267 | 2 |
| 52 | C22:1γLnC22:1 | | 5043 | 9 |
| 52 | C24:1OL | | 5057 | 8 |
| 52 | C22:1OO | | 5077 | 8 |
| 52 | SOS | | 5092 | 7 |
| 54 | C22:1OG | | 5221 | 9 |
| 54 | C22:1OS | | 5256 | 8 |

| PN | Compound Name | AVERAGE (30° C./35° C.) | ΔLRI (30° C./35° C.) |
|----|---|---|---|
| 36 | LnLnLn | 3649 | 2 |
| 36 | γLnγLnγLn | 3744 | 0 |
| 38 | LnLLn | 3821 | 2 |
| 38 | γLnLγLn | 3870 | 4 |
| 38 | PoγLnγLn | 3905 | 8 |
| 40 | LLLn | 3986 | 4 |
| 40 | LnLnO | 3998 | 5 |
| 40 | LLγLn | 4003 | 5 |
| 40 | LnPLn | 4030 | 2 |
| 40 | γLnγLnO | 4058 | 5 |
| 40 | γLnPγLn | 4078 | 3 |
| 42 | LLL | 4146 | 5 |
| 42 | LnLO | 4170 | 5 |
| 42 | γLnLO | 4183 | 5 |
| 42 | SLnLn | 4195 | 3 |
| 42 | γLnLP | 4211 | 5 |
| 42 | SγLnγLn | 4211 | 5 |
| 42 | LnLP | 4219 | 4 |
| 44 | LLO | 4325 | 6 |
| 44 | OOLn | 4352 | 4 |
| 44 | LLP | 4349 | 3 |
| 44 | OOγLn | 4366 | 1 |
| 44 | POLn | 4380 | 2 |
| 44 | POγLn | 4398 | 3 |
| 44 | PγLnP | 4429 | 0 |
| 46 | GLL | 4492 | 7 |
| 46 | OOL | 4508 | 7 |
| 46 | PLO | 4541 | 6 |
| 46 | SLL | 4550 | 0 |
| 46 | SOLn | 4570 | 7 |
| 46 | PLP | 4576 | 3 |
| 46 | SOγLn | 4592 | 6 |
| 46 | SγLnP | 4629 | 5 |
| 48 | C22:1LL | 4681 | 11 |
| 48 | OLG | 4693 | 10 |
| 48 | C24:1LγLn | 4711 | 8 |
| 48 | OOO | 4720 | 8 |
| 48 | GLP | 4726 | 9 |
| 48 | POO | 4755 | 6 |
| 48 | POP | 4778 | 4 |
| 50 | C24:1LL | 4861 | 0 |
| 50 | C22:1LO | 4871 | 11 |
| 50 | GOO | 4888 | 10 |
| 50 | GOP | 4906 | 9 |
| 50 | SLS | 4927 | 13 |
| 50 | SOO | 4926 | 6 |
| 50 | SOP | 4939 | 0 |
| 50 | SPP | 4971 | 4 |

Therefore it was successfully demonstrated that the method of the present invention is almost independent from all the variables involved in the chromatographic apparatus.

Retention indices repeatability studies were carried out in order to assess and demonstrate also the robustness of the novel identification method and to make the LRI database usable both at intra- and inter-laboratory levels.

Reliability Studies by MS Analyses

Among the 224 compounds listed in Table 2, 54 TAGs representative of vegetable oils were positively confirmed by HPLC-ESI-MS analyses, while UHPLC-ESI-MS analyses will be necessary to confirm identification for fish and milk samples. The obtained results demonstrates the great reliability of the method of the present invention.

Nevertheless, if completely co-eluted, different compounds might have the same LRI. However, it is not probable that they present also the same mass spectrum. To this purpose, HPLC-ESI-MS analyses of borage, linseed and olive oils were carried out, providing the confirmation of the preliminary identification by UHPLC-ELSD method for 54 TAGs common in vegetable oils. Also in this case, a comparison between the LRI values calculated on different instrumentation set-up, namely UHPLC-ELSD and HPLC-ESI-MS, was mandatory to verify the proper functioning of the LRI library search, viz. the use of the LRI database, for achieving a reliable identification.

Figure 7:
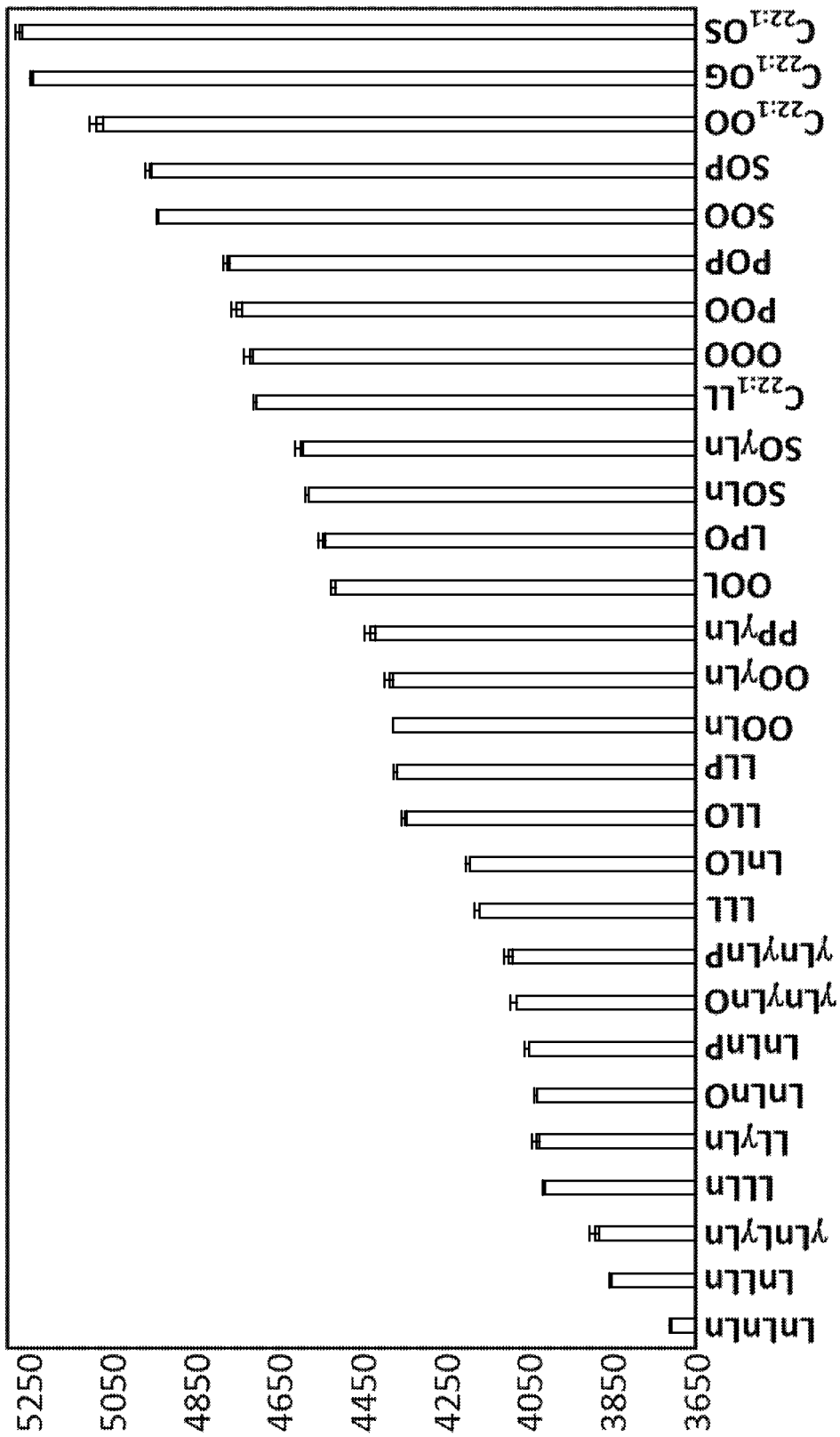
FIG. 7: Histogram reporting the average LRI values between UHPLC-ELSD and HPLC-ESI-MS analyses (values are reported in Table 8); error bar corresponds to ΔLRI value.

Table 8 below contains the comparison for the most abundant TAGs identified in the three oils, along with the average and ΔLRI values, while FIG. 7 reports in a histogram the average values, each with the corresponding ΔLRI.

TABLE 8

Average LRI, ΔLRI and LRI values calculated by UHPLC-ELSD and HPLC-ESI-MS.

| TAG | LRI | | | ΔLRI |
|---|---|---|---|---|
| | UHPLC-ELSD | HPLC-ESI-MS | LRI average | |
| LnLnLn | 3712 | 3709 | 3711 | 2 |
| LnLLn | 3859 | 3853 | 3856 | 3 |
| γLnLγLn | 3902 | 3884 | 3893 | 9 |
| LLLn | 4018 | 4017 | 4018 | 1 |
| LLγLn | 4040 | 4025 | 4033 | 8 |
| LnLnO | 4030 | 4036 | 4033 | 3 |
| LnPLn | 4057 | 4046 | 4052 | 6 |
| γLnγLnO | 4092 | 4077 | 4085 | 8 |
| γLnPγLn | 4111 | 4091 | 4101 | 10 |
| LLL | 4179 | 4169 | 4174 | 5 |
| LnLO | 4202 | 4190 | 4196 | 6 |
| LLO | 4352 | 4343 | 4348 | 5 |
| LLP | 4373 | 4363 | 4368 | 5 |
| OOLn | 4375 | 4372 | 4374 | 2 |
| OOγLn | 4397 | 4377 | 4387 | 10 |
| PγLnP | 4443 | 4419 | 4431 | 12 |
| OOL | 4524 | 4514 | 4519 | 5 |
| PLO | 4555 | 4538 | 4547 | 9 |
| SOLn | 4584 | 4575 | 4580 | 5 |
| SOγLn | 4609 | 4594 | 4602 | 8 |
| C22:1LL | 4709 | 4704 | 4707 | 3 |
| OOO | 4732 | 4716 | 4724 | 8 |

TABLE 8-continued

Average LRI, ΔLRI and LRI values calculated
by UHPLC-ELSD and HPLC-ESI-MS.

| TAG | LRI | | | |
|---|---|---|---|---|
| | UHPLC-ELSD | HPLC-ESI-MS | LRI average | ΔLRI |
| POO | 4764 | 4740 | 4752 | 12 |
| POP | 4782 | 4769 | 4776 | 7 |
| SOO | 4941 | 4940 | 4941 | 1 |
| SOP | 4959 | 4968 | 4964 | 5 |
| C22:1OO | 5102 | 5072 | 5087 | 15 |
| C22:1OG | 5239 | 5245 | 5242 | 3 |
| C22:1OS | 5267 | 5280 | 5274 | 7 |

Conversely, the chromatographic method of the present invention can also be used to discriminate compounds having very similar or identical mass spectra. In summary, using retention indices in LC coupled with MS, particularly EI-MS or API-MS, does significantly increase the reliability of peak identifications by providing a second, independent experimental value.

OTHER EMBODIMENTS

The embodiments and examples herein described have illustrative purpose only and they are not meant to limit the scope of the invention as claimed. The determination of other lipid species, such as free fatty acids, mono- and diacylglycerols, as well as sterols, carotenoids and waxes falls within the scope of the present invention. In fact, the inventors plan to make the method suitable for a holistic lipid profiling of different real-word samples in the near future. It is also obvious that the retention indices database of the present invention can be extended by including retention indices of other lipid species such as, for example, those of free fatty acids, mono- and diacylglycerols, as well as of sterols, carotenoids and waxes, for achieving a comprehensive database of all lipid species retention behaviour (e.g., $t_R$ and RI) of different real-world samples. The inventors are also planning to apply the retention index system to chromatographic method also suitable for the determination of polar lipids, such as phospholipids.

EXAMPLES

Samples Preparation

Example 1

Vegetable Samples Preparation

Vegetable oil samples were prepared by dissolving 10 mg of oil in 10 mL of 2-propanol, except for borage oil for which 10 mg were dissolved in 1 mL of the same solvent.

Example 2

Milk Samples Preparation (by Folch)

10 mL of milk were treated with 40 mL of a chloroform: methanol mixture (1:2 v/v) and placed in an ice bath under magnetic stirring for 30 minutes; the content was transferred to a separating funnel and shaken vigorously for 5 minutes; after, the mixture was collected into different tubes and centrifuged at 3000 rpm for 15 minutes. Once obtained the separation of phases, the phases below (comprising the lipid fraction) were pooled together, the upper phases (aqueous) were added again to the separating funnel for a further extractions with 20 mL of chloroform: methanol mixture (2:1 v:v). The last step was replicated once again. The pooled organic phases were filtered on anhydrous sodium sulphate and evaporated using a rotary evaporator.

Example 3

Fish Samples Preparation (by Bligh&Dyer)

10 g of fish tissue were weighed and reduced to small pieces. The sample was extracted with 30 mL of a mixture chloroform: methanol (1:2 v:v) and homogenized by using an Ultra Turrax apparatus for 10 min. Then, 10 mL of chloroform and 18 mL of distilled water were added and re-homogenized for 1 min; the mixture was collected into different tubes and centrifuged at 3000 rpm for 15 min. The lower organic phases were pooled, while the aqueous upper phases were extracted again with 20 mL 10% (v/v) methanol in chloroform. Then, all the organic phases were pooled together, filtered on anhydrous evaporated using a rotary evaporator.

Instrumentation and Preferred Analytical Conditions

Example 4

HPLC-ESI-MS

Analyses were carried out by using an Waters Alliance HPLC 2695 separation module consisting of a quaternary pump, autosampler and column thermostat, coupled to a Micromass Quattro micro API bench-top triple quadrupole mass spectrometer (Waters Associates Inc, Milford, Mass., USA). Separations were carried out on an Ascentis Express C18 100×2.1 mm (L×ID), 2.0 μm $d_p$ column (MilliporeSigma). Mobile phases were (A) acetonitrile: 10 mM aqueous ammonium formate 95:5 (v:v) and (B) 2-propanol under gradient conditions: 0-52.5 min, 0-55% B (held for 17.5 min). The flow rate was set at 400 μL/min with oven temperature of 35° C.; injection volume was 2 μL. MS acquisitions were performed using the Z-spray electrospray (ESI) source operating in positive ionization modes, under the following conditions: mass spectral range, 250-1250 m/z; event time, 1 s; desolvation gas (N2) flow, 700.0 L hr$^{-1}$; no cone gas was applied; source temperature, 150° C.; desolvation temperature, 250° C.; capillary voltage, 3 KV; cone voltage, 80 V; extractor voltage, 3 V; RF lens, 0.2 V.

Example 5

UHPLC-ELSD

Analyses were carried out by using a Nexera X2 system (Shimadzu, Kyoto, Japan), consisting of a CBM-20A controller, two LC-30AD dual-plunger parallel-flow pumps (120.0 MPa maximum pressure), a DGU-20A5R degasser, a CTO-20AC column oven, a SIL-30AC autosampler, and a SPD M30A PDA detector (1.8 μL detector flow cell volume). The UHPLC system was coupled to an ELSD (Evaporative Light Scattering Detector) detector (Shimadzu). Separations were carried out on two serially coupled Titan C18 100×2.1 mm (L×ID), 1.9 μm $d_p$ columns (MilliporeSigma, Bellefonte, Pa., USA). Mobile phases were (A) acetonitrile and (B) 2-propanol under gradient conditions: 0-105 min, 0-50% B (held for 20 min). The flow rate was set at 400

µL/min with oven temperature of 35° C.; injection volume was 5 µL. The following ELSD parameters were applied: evaporative temperature 60° C., nebulizing gas (N2) pressure 270 kPa, detector gain <1 mV; sampling frequency: 10 Hz.

Example 6

Identification of a Real-World Lipid Sample

Different fish and vegetable oils were injected and positively identified using the chromatographic embodiment and the LRI method described in the present invention.

Figure 8:
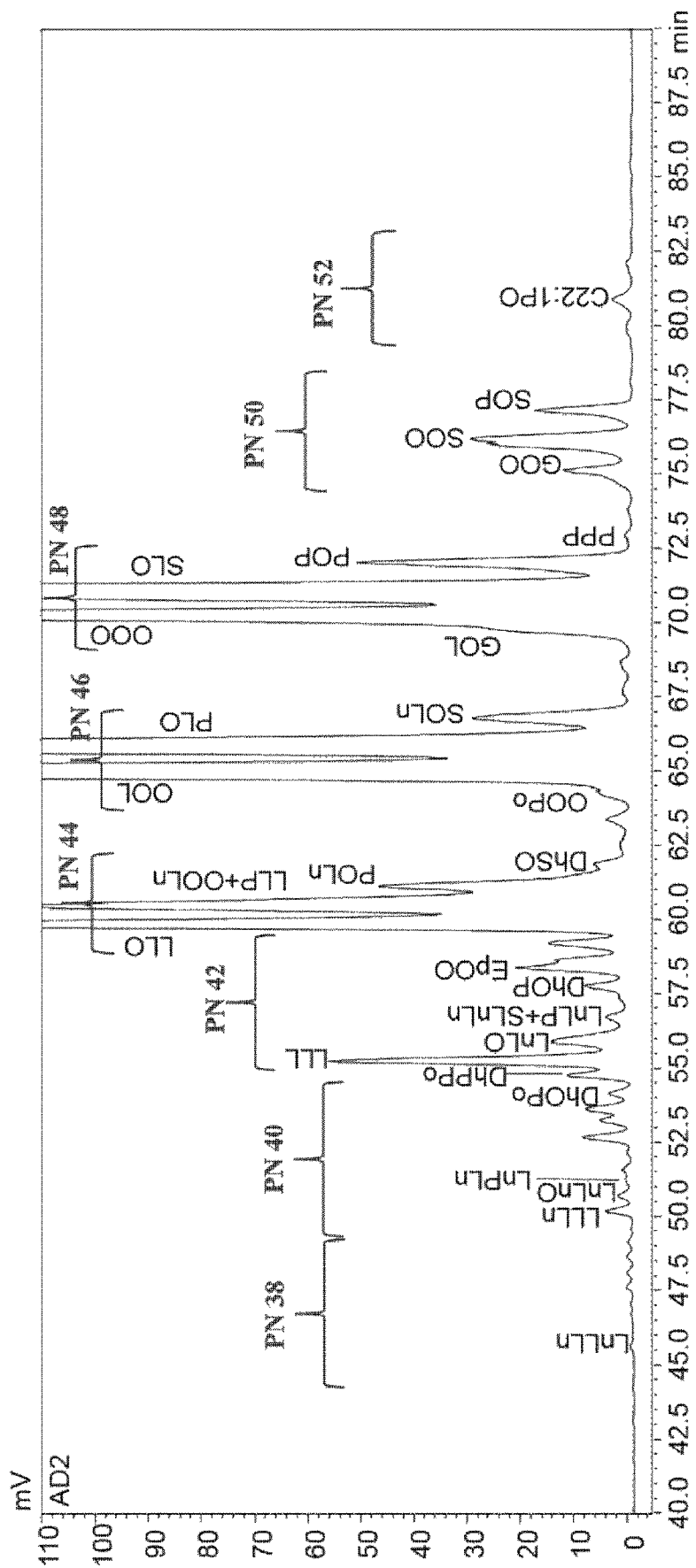
FIG. 8: sea bass chromatogram, provided as example of a sample chromatogram identified using solely the LRI database.

FIG. 8 below shows the chromatogram of a sea bass lipid sample, extracted according to the procedure reported in Example 3 (Bligh&Dyer method), and analyzed according to the instrumental setup and analytical conditions reported in Example 5 (UHPLC-ELSD method). Peak identification based solely on the LRI identification method is reported in both the chromatogram and Table 9. A total of 30 TAGs were positively identified, being the difference between tabulated and experimental values ΔLRI≤15. Furthermore all identified compounds were confirmed by HPLC-ESI-MS analysis. The expansion of the database could ensure the identification of a major number of compounds.

TABLE 9

PN, $LRI_{tab}$, $LRI_{exp}$ and Δ values obtained for the identified peaks in a sea bass sample

| PN | Compound name | $LRI_{tab}$ | $LRI_{exp}$ | ΔLRI |
|---|---|---|---|---|
| 38 | LnLLn | 3830 | 3821 | −9 |
| 40 | LLLn | 3993 | 3980 | −13 |
| 40 | LnLnO | 4011 | 3998 | −13 |
| 40 | LnPLn | 4023 | 4017 | −6 |
| 40 | DhOPo | 4135 | 4120 | −15 |
| 40 | DhPPo | 4148 | 4141 | −7 |
| 42 | LLL | 4160 | 4158 | −2 |
| 42 | LnLO | 4192 | 4183 | −9 |
| 42 | LnLP + SLnLn | 4217 | 4210 | −7 |
| 42 | DhOP | 4246 | 4246 | 0 |
| 42 | EpOO | 4261 | 4264 | 3 |
| 44 | LLO | 4342 | 4330 | −12 |
| 44 | LLP + OOLn | 4358 | 4345 | −13 |
| 44 | POLn | 4383 | 4368 | −15 |
| 44 | DhSO | 4399 | 4384 | −15 |
| 44 | OOPo | 4485 | 4482 | −3 |
| 46 | OOL | 4516 | 4505 | −11 |
| 46 | PLO | 4539 | 4533 | −6 |
| 46 | SOLn | 4563 | 4570 | 7 |
| 48 | OLG | 4703 | 4691 | −12 |
| 48 | OOO | 4729 | 4716 | −13 |
| 48 | SLO | 4746 | 4739 | −7 |
| 48 | POP | 4776 | 4776 | 0 |
| 48 | PPP | 4784 | 4799 | 15 |
| 50 | GOO | 4905 | 4896 | −9 |
| 50 | SOO | 4948 | 4937 | −11 |
| 50 | SOP | 4961 | 4974 | 13 |
| 52 | C22:1PO | 5084 | 5099 | 15 |

The invention claimed is:

1. A method for the identification of unknown compounds in liquid chromatography based on a homologous series of triacylglycerols (TAGs) composed by odd-chain fatty acids as a Retention Index System comprising the following steps:
   a. attribution of a retention index value to each reference TAG;
   b. chromatographic separation of a TAGs reference mixture;
   c. chromatographic separation of unknown compounds in a sample;
   d. determination of the retention index value of each separated unknown compound; and
   e. identification of each unknown compounds.

2. The method of claim 1, wherein the homologous series comprises triacylglycerols ranging from triheptanoin to triheneicosanoin, or any portion thereof.

3. The method of claim 2, wherein the homologous series comprises triacylglycerols ranging:
   from triheptanoin (C7C7C7) to trinonadecanoin (C19C19C19); or
   from trinonanoin (C9C9C9) to trinonadecanoin (C19C19C19); or
   from trinonanoin (C9C9C9) to triheneicosanoin (C21C21C21); or
   any portion thereof.

4. The method of claim 1, wherein the chromatographic separation (steps b. and c.) is performed in an acetonitrile/2-propanol mobile phase.

5. The method of claim 4, wherein the chromatographic separation is performed in gradient elution.

6. The method of claim 1, wherein the determination of the retention index value (step d.) is carried out by applying the following equation:

$$LRI = 100\left[z + n\frac{t_{Ri} - t_{Rz}}{t_{R(z+n)} - t_{Rz}}\right]$$

wherein,
$t_{Ri}$ is the retention time of the unknown compound i, $t_{Rz}$ and $t_{R(z+1)}$ are the retention times of the TAGs which elute, respectively, immediately before and immediately after the unknown compound i, z is the partition number (PN) associated with the compound eluted immediately before the unknown compound i, and n represents the difference in z units between the reference TAGs eluted immediately before and after the unknown compound.

7. The method of claim 6, wherein the identification step e. is performed by comparison of the calculated LRI value for the unknown compound with those previously obtained for listed compounds.

8. The method of claim 6, wherein the identification step e. is automatically performed by means of a software, wherein said software automatically matches the LRI value of the unknown compound with those of a LRI library.

9. The method according to claim 1, wherein the obtained retention index values are used to discriminate between analytes with the same mass fragmentations.

10. The method according to claim 1, wherein the obtained retention index values have a determination repeatability minor than the peak width at base of the unknown compounds.

* * * * *